(12) United States Patent
Tomonaga et al.

(10) Patent No.: US 7,782,429 B2
(45) Date of Patent: Aug. 24, 2010

(54) LIQUID CRYSTAL PANEL AND LIQUID CRYSTAL DISPLAY APPARATUS

(75) Inventors: Masatoshi Tomonaga, Osaka (JP); Naoto Ooe, Osaka (JP); Kenji Yoda, Osaka (JP); Shuuji Yano, Osaka (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 247 days.

(21) Appl. No.: 12/162,519

(22) PCT Filed: Jan. 31, 2007

(86) PCT No.: PCT/JP2007/051617

§ 371 (c)(1),
(2), (4) Date: Jul. 29, 2008

(87) PCT Pub. No.: WO2007/091467

PCT Pub. Date: Aug. 16, 2007

(65) Prior Publication Data

US 2009/0002606 A1 Jan. 1, 2009

(30) Foreign Application Priority Data

Feb. 6, 2006 (JP) ............................. 2006-028242

(51) Int. Cl.
*G02F 1/1335* (2006.01)
(52) U.S. Cl. ..................................................... 349/119
(58) Field of Classification Search ................. 349/118, 349/119
See application file for complete search history.

(56) References Cited

U.S. PATENT DOCUMENTS 6,115,095 A 9/2000 Suzuki et al.

(Continued)

FOREIGN PATENT DOCUMENTS

JP 11-133408 A 5/1999

(Continued)

OTHER PUBLICATIONS

International Search Report of PCT/JP2007/051617, date of mailing Apr. 17, 2007.

*Primary Examiner*—Sung H Pak
(74) *Attorney, Agent, or Firm*—Westerman, Hattori, Daniels & Adrian, LLP

(57) ABSTRACT

Provided are a liquid crystal panel capable of constituting a liquid crystal display apparatus in which a contrast and a display color are unlikely to change depending upon a viewing angle and an azimuth, and a liquid crystal display apparatus using the liquid crystal panel. The liquid crystal panel of the present invention at least includes a liquid crystal cell, a first polarizer placed on one side of the liquid crystal cell, a second polarizer placed on another side of the liquid crystal cell, a first optical element placed between the liquid crystal cell and the first polarizer, a second optical element placed between the liquid crystal cell and the first optical element, and a third optical element placed between the liquid crystal cell and the second polarizer, in which an absorption axis of the first polarizer is perpendicular to an absorption axis of the second polarizer, the first optical element has a relationship of $nz > nx = ny$, the second optical element has a relationship of $nx > ny = nz$ and a slow axis thereof parallel to an absorption axis of the first polarizer, and the third optical element has an optical isotropy.

17 Claims, 22 Drawing Sheets

U.S. PATENT DOCUMENTS

| | | |
|---|---|---|
| 2006/0203158 A1 | 9/2006 | Parri et al. |
| 2010/0026940 A1* | 2/2010 | Takegami et al. ........... 349/102 |
| 2010/0045910 A1* | 2/2010 | Bitou et al. ................. 349/118 |
| 2010/0066958 A1* | 3/2010 | Takeda et al. ............... 349/118 |

FOREIGN PATENT DOCUMENTS

| | | |
|---|---|---|
| WO | 2004-090627 A1 | 10/2004 |

* cited by examiner

LIQUID CRYSTAL PANEL AND LIQUID CRYSTAL DISPLAY APPARATUS

TECHNICAL FIELD

The present invention relates to a liquid crystal panel and a liquid crystal display apparatus. More specifically, the present invention relates to a liquid crystal panel in which particular optical elements are placed in a particular order on both sides of a liquid crystal cell, and a liquid crystal display apparatus using the liquid crystal panel.

BACKGROUND ART

A liquid crystal display apparatus has features such as thinness, light weight, and low power consumption. Therefore, the liquid crystal display apparatus has been widely used in mobile equipment such as a mobile telephone and a watch, OA equipment such as a personal computer monitor and a notebook computer, household electric products such as a video camera and a liquid crystal television, and the like. The reason why the liquid crystal display apparatus has been widely used as such is that the defects such as the variation in display properties depending upon the viewing angle of a screen, and the malfunction caused by a high temperature, an extremely low temperature, or the like are being overcome by technical innovation. However, as applications cover a broader range, properties required in the respective applications are changing. For example, in an application for a floor-type television, several people watch a screen simultaneously. Therefore, there is a demand for a display whose contrast and a display color are unlikely to change depending upon a viewing angle and an azimuth. In order to enhance the contrast of the liquid crystal display apparatus, it is important to reduce light leakage in the case of displaying a black image. In order to obtain a vivid color display in the liquid crystal display apparatus, it is important to reduce slight coloration of leaked light.

Conventionally, various kinds of retardation films have been used in the liquid crystal display apparatus. For example, a method is disclosed in which a retardation film (so-called positive C plate) having a refractive index ellipsoid of nz>nx=ny and a retardation film (so-called positive A plate) having a refractive index ellipsoid of nx>ny=nz are placed on one side of a liquid crystal cell of an in-plane switching (IPS) system, whereby a color shift is enhanced (for example, see Patent Document 1). However, the display properties of a liquid crystal display apparatus obtained by a conventional technology are not sufficient, and therefore, further improvement has been desired.

Patent Document 1: JP 11-133408 A

DISCLOSURE OF THE INVENTION

Problems to be Solved by the Invention

It is an object of the present invention to provide a liquid crystal panel capable of constituting a liquid crystal display apparatus in which a contrast and a display color are unlikely to change depending upon a viewing angle and an azimuth, and a liquid crystal display apparatus using the liquid crystal panel.

Means for Solving the Problems

A liquid crystal panel of the present invention at least includes: a liquid crystal cell; a first polarizer placed on one side of the liquid crystal cell; a second polarizer placed on another side of the liquid crystal cell; a first optical element placed between the liquid crystal cell and the first polarizer; a second optical element placed between the liquid crystal cell and the first optical element; and a third optical element placed between the liquid crystal cell and the second polarizer, in which an absorption axis direction of the first polarizer is substantially perpendicular to an absorption axis direction of the second polarizer;

the first optical element has a refractive index ellipsoid of nz>nx=ny;

the second optical element has a refractive index ellipsoid of nx>ny=nz, and a slow axis direction thereof is substantially parallel to an absorption axis direction of the first polarizer; and the third optical element has isotropy substantially optically;

where nx, ny, and nz represent a refractive index in a slow axis direction, a refractive index in a fast axis direction, and a refractive index in a thickness direction.

In a preferred embodiment, the liquid crystal cell has a liquid crystal layer containing liquid crystal molecules aligned homogeneously in absence of an electric field.

In a preferred embodiment, an initial alignment direction of the liquid crystal cell and an absorption axis direction of the second polarizer are substantially parallel to each other.

In a preferred embodiment, an initial alignment direction of the liquid crystal cell and a slow axis direction of the second optical element are substantially perpendicular to each other.

In a preferred embodiment, a sum of Rth[590] of the first optical element and Re[590] of the second optical element, Rth[590]+Re[590], is −10 nm to 120 nm, where Rth[590] and Re[590] are a thickness direction retardation value and an in-plane retardation value, respectively, measured with a light having a wavelength of 590 nm at 23° C.

In a preferred embodiment, the first optical element has Rth[590] of −200 nm to −50 nm, where Rth[590] is an thickness direction retardation value measured with h a light having a wavelength of 590 nm at 23° C.

In a preferred embodiment, the first optical element has a wavelength dispersion value ($D_1$) of 0.70 to 1.10, where $D_1$ is a value calculated from an expression: R40[480]/R40[590], and R40[480] and R40[590] are retardation values measured at a tilt angle of 40° from a normal direction with lights having wavelengths of 480 nm and 590 nm at 23° C., respectively.

In a preferred embodiment, the first optical element includes a solidified layer or cured layer of a liquid crystalline composition containing a homeotropically aligned liquid crystal compound.

In a preferred embodiment, the second optical element has Re[590] of 90 nm to 190 nm, where Re[590] is an in-plane retardation value measured with a light having a wavelength of 590 nm at 23° C.

In a preferred embodiment, the second optical element has a wavelength dispersion value ($D_2$) of 0.70 to 1.10, where $D_2$ is a value calculated from an expression: Re[480]/Re[590], and Re[480] and Re[590] are in-plane retardation values measured from a normal direction with lights having wavelengths of 480 nm and 590 nm at 23° C., respectively.

In a preferred embodiment, the second optical element includes a retardation film containing, as a main component, a norbornene-based resin, a cellulose-based resin, or a polycarbonate-based resin.

In a preferred embodiment, the third optical element has an absolute value of a photoelastic coefficient measured with a light having a wavelength of 590 nm at 23° C., C[590] (m$^2$/N), of $1.0 \times 10^{-12}$ to $8.0 \times 10^{-11}$.

In a preferred embodiment, the third optical element includes an optical film containing, as a main component, a norbornene-based resin, a cellulose-based resin, or an acrylic resin.

According to another aspect of the present invention, a liquid crystal display apparatus is provided. The liquid crystal display apparatus of the present invention includes a liquid crystal panel of the present invention.

In a preferred embodiment, a maximum value of tristimulus values Y defined in a CIE1931XYZ display system at a polar angle of 60° and an azimuth angle of 0° to 360° in a case where a black image is displayed is 1.5 or less.

In a preferred embodiment, a difference between a maximum value and a minimum value of tristimulus values Y defined in a CIE1931XYZ display system at a polar angle of 60° and an azimuth angle of 0° to 360° in a case where a black image is displayed is 1.0 or less.

In a preferred embodiment, the liquid crystal display apparatus is used for a liquid crystal television.

Effects of the Invention

According to the present invention, a liquid crystal panel capable of constituting a liquid crystal display apparatus in which a contrast and a display color are unlikely to change depending upon a viewing angle and an azimuth, and a liquid crystal display apparatus using the liquid crystal panel can be provided.

Such an effect can be expressed easily by:

(a) placing at least a second optical element (so-called positive A plate having a refractive index ellipsoid of nx>ny=nz), a first optical element (so-called positive C plate having a refractive index ellipsoid of nz>nx=ny), and a first polarizer in the stated order on one side of a liquid crystal cell from the liquid crystal cell side;

(b) placing at least a third optical element (substantially optically isotropic optical element) and a second polarizer in the stated order on another side of the liquid crystal cell from the liquid crystal cell side;

(c) setting an absorption axis direction of the first polarizer to be substantially perpendicular to an absorption axis direction of the second polarizer; and (d) setting a slow axis direction of the second optical element to be substantially parallel to an absorption axis direction of the first polarizer.

Figure 1:
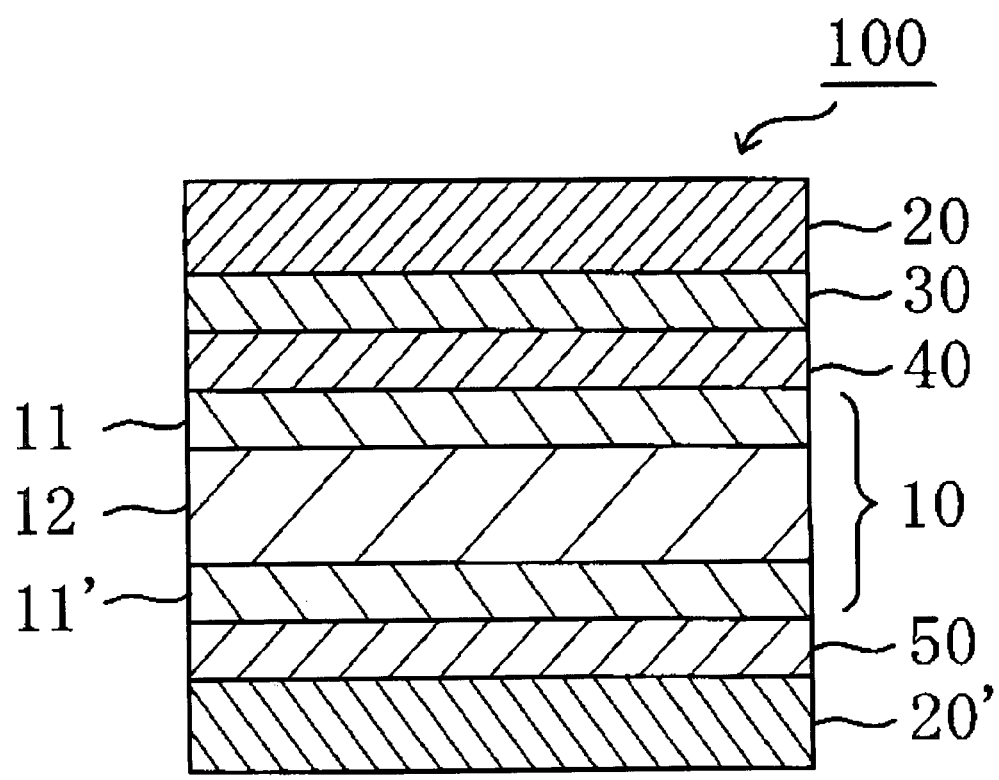
FIG. 1 is a schematic cross-sectional view of a liquid crystal panel according to a preferred embodiment of the present invention.

DESCRIPTION OF SYMBOLS 10 liquid crystal cell
11 substrate
11' substrate
12 liquid crystal layer
13 spacer
20 first polarizer
20, second polarizer
25 protective layer
25' protective layer
30 first optical element (positive C plate)
40 second optical element (positive A plate)
50 third optical element (isotropic optical element)
55 negative C plate
60 protective layer
60' protective layer
70 surface treated layer
70' surface treated layer
80 brightness enhancement film
110 prism sheet
120 light guide plate
130 lamp
80 reflector 100 liquid crystal panel
200 liquid crystal display apparatus

BEST MODE FOR CARRYING OUT THE
INVENTION

Definitions of Terms and Symbols

Definitions of terms and symbols in the specification of the present invention are described below.

(1) The symbol "nx" refers to a refractive index in a direction providing a maximum in-plane refractive index (that is, a slow axis direction), the symbol "ny" refers to a refractive index in a direction perpendicular to the slow axis in the plane (that is, a fast axis direction), and the symbol "nz" refers to a refractive index in a thickness direction. Further, the expression "nx=ny", for example, not only refers to a case where nx and ny are exactly equal to each other but also includes a case where nx and ny are substantially equal to each other. In the specification of the present invention, the phrase "substantially equal" includes a case where nx and ny differ within a range providing no effects on overall optical properties of an optical film (retardation film or the like) in practical use.

(2) The term "in-plane retardation Re[$\lambda$]" refers to an in-plane retardation value of a film (layer) measured at 23° C. by using a light having a wavelength of $\lambda$ nm. Re[$\lambda$] can be determined from an equation: Re[$\lambda$]=(nx−ny)×d, where nx and ny represent refractive indices of a film (layer) at a wavelength of $\lambda$ nm in a slow axis direction and a fast axis direction, respectively, and d (nm) represents a thickness of the film (layer). For example, Re[480], Re[590], and Re[630] represent in-plane retardations at wavelengths of 480 nm, 590 nm, and 630 nm, respectively.

(3) The term "retardation R40[$\lambda$]" refers to a retardation value measured at a tilt angle of 40° from a normal direction with a light having a wavelength of $\lambda$ nm at 23° C. R40[$\lambda$] is obtained by an expression: R40[$\lambda$]=(nx−ny)×d, where nx and ny represent refractive indices of a film (layer) at a wavelength $\lambda$nm in a slow axis direction and a fast axis direction, respectively, and d (nm) represents a thickness of the film (layer). For example, R40 [480] and R40 [590] represent retardation values measured at a tilt angle of 40° from a normal direction with lights having wavelengths of 480 nm and 590 nm, respectively.

(4) The term "thickness direction retardation Rth[$\lambda$]" refers to a thickness direction retardation value measured at 23° C. by using a light having a wavelength of $\lambda$ nm. Rth[$\lambda$] can be determined from an equation: Rth[$\lambda$]=(nx−nz)×d, where nx and nz represent refractive indices of a film (layer) at a wavelength of $\lambda$ nm in a slow axis direction and a thickness direction, respectively, and d (nm) represents a thickness of the film (layer). For example, Rth[590] represents a thickness direction retardation value at a wavelength of 590 nm.

(5) An Nz coefficient can be determined from an expression: Nz=(nx−nz)/(nx−ny).

(6) The term "substantially perpendicular" as used herein includes the case where an angle formed by two axes (for example, an absorption axis of a polarizer and an absorption axis of another polarizer) is 90°±2.00, preferably 90°±1.0, and more preferably 90°±±0.50.

(7) The term "substantially parallel" as used herein includes the case where two axes (for example, a slow axis of a retardation film and an absorption axis of a polarizer) is 0°±2.0°, preferably 0°±1.00, and more preferably 0°±0.50.

A. Outline of Entire Liquid Crystal Panel

Figure 2:
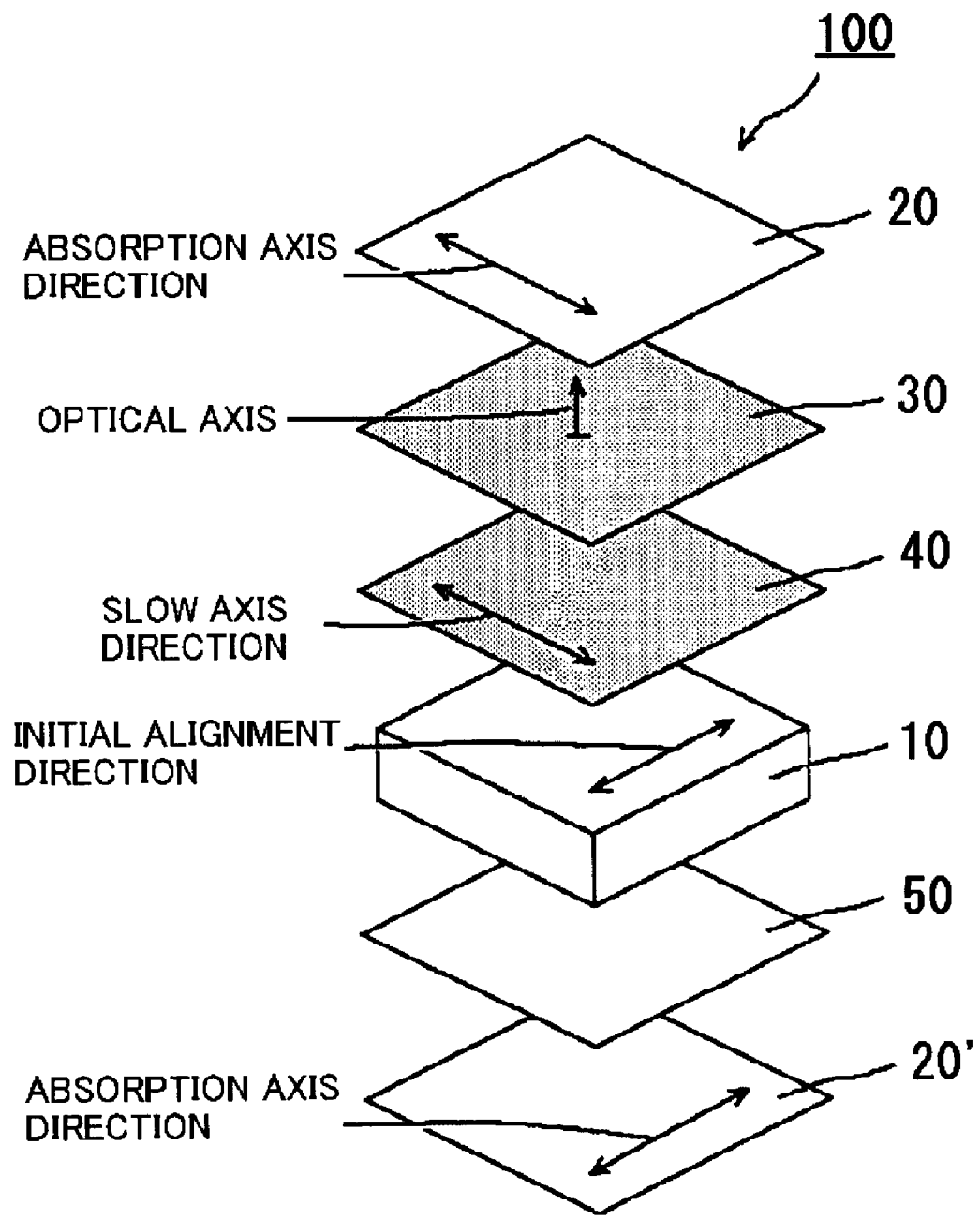
FIG. 2 is a schematic perspective view of the liquid crystal panel according to the preferred embodiment of the present invention.

FIG. 1 is a schematic cross-sectional view of a liquid crystal panel according to a preferred embodiment of the present invention. FIG. 2 is a schematic perspective view of the liquid crystal panel according to the preferred embodiment of the present invention. Note that, a ratio among length, width, and thickness of each member in FIGS. 1 and 2 is different from that of an actual member for clarity. For example, as shown in FIG. 2, a liquid panel 100 includes a liquid crystal cell 10, a first polarizer 20 placed on one side (viewer side in FIG. 2) of the liquid crystal cell 10, a second polarizer 20' placed on another side (backlight side in FIG. 2) of the liquid crystal cell 10, a first optical element (positive C plate) 30 and a second optical element (positive A plate) 40 both of which are placed between the first polarizer 20 and the liquid crystal cell 10, and a third optical element (isotropic optical element) 50 placed between the second polarizer 20' and the liquid crystal cell 10. The second optical element (positive A plate) 40 is placed between the liquid crystal cell 10 and the first optical element (positive C plate) 30 such that a slow axis direction thereof and an absorption axis direction of the first polarizer 20 are substantially parallel to each other. The polarizers 20 and 20' are placed such that respective absorption axes are perpendicular to each other. In practical use, any appropriate protective layers (not shown) may be placed on outer sides of the first polarizer 20 and the second polarizer 20'. In another embodiment of the present invention, other members (preferably an isotropic optical element) may be placed between the members shown in FIG. 1. Further, in another embodiment, another optical element (preferably, a negative C plate having a refractive index ellipsoid that satisfies nx=ny>nz) may be placed between the first polarizer 20 and the first optical element (positive C plate) 30.

Preferably, the second polarizer 20' (i.e., the polarizer placed on the side where the third optical element (isotropic optical element) 50 is placed) is placed so that an absorption axis thereof is substantially parallel to an initial alignment direction of the liquid crystal cell 10. Preferably, the first polarizer 20 is placed so that an absorption axis thereof is substantially perpendicular to the initial alignment direction of the liquid crystal cell 10. Preferably, the second optical element (positive A plate) 40 is placed so that a slow axis thereof is substantially perpendicular to the initial alignment direction of the liquid crystal cell 10.

The liquid crystal panel of the present invention may be of so-called O-mode or so-called E-mode. The term "liquid crystal panel of O-mode" refers to a liquid crystal panel in which an absorption axis of a polarizer placed on a backlight side of a liquid crystal cell and an initial alignment direction of the liquid crystal cell are parallel to each other. The term "liquid crystal panel of E-mode" refers to a liquid crystal panel in which an absorption axis of a polarizer placed on a backlight side of a liquid crystal and the initial alignment direction of the liquid crystal cell are perpendicular to each other. In the present invention, a liquid crystal panel of O-mode as shown in FIG. 2 is preferred because an arrangement of O-mode can realize better optical compensation. To be specific, in the arrangement of O-mode, the positive C plate and the positive A plate are placed on a far side from backlight, and thus hardly receive adverse effects due to heat of backlight, to thereby reduce shift or unevenness in retardation values. In a case of the liquid crystal panel of O-mode, as shown in FIG. 2, the first polarizer 20, the first optical element (positive C plate) 30, and the second optical element (positive A plate) 40 are preferably placed on a viewer side of the liquid crystal cell 10, and the third optical element (isotropic optical element) 50 and the second polarizer 20, are preferably placed on a backlight side of the liquid crystal cell 10.

B. Liquid Crystal Cell

Referring to FIG. 1, the liquid crystal cell 10 used in the present invention is provided with a pair of substrates 11 and 11' and a liquid crystal layer 12 as a display medium held between the substrates 11 and 11'. One substrate (color filter substrate) 11 is provided with color filters and black matrix (both not shown). The other substrate (active matrix substrate) 11' is provided with a switching element (typically TFT) for controlling electrooptic properties of liquid crystals, a scanning line for providing a gate signal to the switching element and a signal line for providing a source signal thereto, and a pixel electrode and a counter electrode (both not shown). The color filters may be provided on the active matrix substrate 11' side as well. A distance (cell gap) between the substrates 11 and 11' is controlled by a spacer (not shown). An alignment film (not shown) formed of, for example, polyimide is provided on a side of each of the substrates 11 and 11', which is in contact with the liquid crystal layer 12.

The liquid crystal cell 10 preferably includes a liquid crystal layer containing liquid crystal molecules aligned homogeneously in the absence of an electric field. The liquid crystal layer (eventually, the liquid crystal cell) generally exhibits a refractive index profile of nx>ny=nz (where nx, ny, and nz represent refractive indices in the slow axis direction, fast axis direction, and thickness direction of the liquid crystal layer, respectively). Further, the phrase "initial alignment direction of the liquid crystal cell" refers to a direction providing a maximum in-plane refractive index of the liquid crystal layer by alignment of the liquid crystal molecules in the liquid crystal layer in the absence of an electric field. Typical examples of drive mode using the liquid crystal layer exhibiting such refractive index profile include in-plane switching (IPS) mode, fringe field switching (FFS) mode, and ferroelectric liquid crystal (FLC) mode. Specific examples of liquid crystals used for those drive modes include nematic liquid crystals and smectic liquid crystals. For example, the nematic liquid crystals are used for the IPS mode and the FFS mode, and the smectic liquid crystals are used for the FLC mode.

In the IPS mode, homogeneously aligned liquid crystal molecules in the absence of an electric field respond in an electric field parallel to substrates (also referred to as a horizontal electric field) generated between a counter electrode and a pixel electrode each formed of metal, for example, by utilizing an electrically controlled birefringence (ECB) effect. To be specific, as described in "Monthly Display July" (p. 83 to p. 88, published by Techno Times Co., Ltd., 1997) or "Ekisho vol. 2, No. 4" (p. 303 to p. 316, published by Japanese Liquid Crystal Society, 1998), a normally black mode provides completely black display in the absence of an electric field by: adjusting an alignment direction of the liquid crystal cell without application of an electric field, in a direction of an absorption axis of one polarizer; and placing polarizing plates above and below the liquid crystal cell to be perpendicular to each other. Under application of an electric field, liquid crystal molecules rotate while remaining parallel to substrates, to thereby obtain a transmittance in accordance with a rotation angle. The IPS mode includes super in-plane switching (S-IPS) mode and advanced super in-plane switching (AS-IPS) mode each employing a V-shaped electrode, a zigzag electrode, or the like. Examples of a commercially available liquid crystal display apparatus of the IPS mode include: 20-inch wide liquid crystal television "Wooo" (trade name, manufactured by Hitachi, Ltd.); 19-inch liquid crystal display "ProLite E481S-1" (trade name, manufactured by Iiyama Corporation); and 17-inch TFT liquid crystal display "FlexScan L565" (trade name, manufactured by Eizo Nanao Corporation).

In the FFS mode, homogeneously aligned liquid crystal molecules in the absence of an electric field respond in an electric field parallel to substrates (also referred to as a horizontal electric field) generated between a counter electrode and a pixel electrode each formed of transparent conductor, for example, by utilizing an electrically controlled birefringence effect. The horizontal electric field in the FFS mode is referred to as fringe electric field, which can be generated by setting a distance between the counter electrode and the pixel electrode each formed of transparent conductor narrower than a cell gap. To be specific, as described in "Society for Information Display (SID) 2001 Digest" (p. 484 to p. 487) or JP 2002-031812 A, a normally black mode provides completely black display in the absence of an electric field by: adjusting an alignment direction of the liquid crystal cell without application of an electric field, in a direction of an absorption axis of one polarizer; and placing polarizing plates above and below the liquid crystal cell to be perpendicular to each other. Under application of an electric field, liquid crystal molecules rotate while remaining parallel to substrates, to thereby obtain a transmittance in accordance with a rotation angle. Note that the FFS mode includes advanced fringe field switching (A-FFS) mode and ultra fringe field switching (U-FFS) mode each employing a V-shaped electrode, a zigzag electrode, or the like. An example of a commercially available liquid crystal display apparatus of the FFS mode includes Tablet PC "M1400" (trade name, manufactured by Motion Computing, Inc.).

The FLC mode utilizes property of ferromagnetic chiral smectic liquid crystals encapsulated between electrode substrates each having a thickness of about 1 to 2 μm to exhibit two stable states of molecular alignment, for example. To be specific, the ferroelectric chiral smectic liquid crystal molecules rotate within a plane parallel to the substrates and respond due to application of a voltage. The FLC mode can provide black and white displays based on the same principle as that of the IPS mode or the FFS mode. The FLC mode has such a feature in that a response speed is high compared with those in other drive modes. In the specification of the present invention, the FLC mode includes: surface stabilized ferroelectric liquid crystal (SS-FLC) mode; antiferroelectric liquid crystal (AFLC) mode; polymer stabilized ferroelectric liquid crystal (PS-FLC) mode; and V-shaped switching ferroelectric liquid crystal (V-FLC) mode.

The homogeneously aligned liquid crystal molecules are obtained, as a result of interaction between a substrate subjected to alignment treatment and liquid crystal molecules, when alignment vectors of the liquid crystal molecules are parallel to a substrate plane and uniformly aligned. In the specification of the present invention, homogenous alignment includes a case where the alignment vectors are slightly tilted with respect to the substrate plane, that is, a case where the liquid crystal molecules are pretilted. In a case where the liquid crystal molecules are pretilted, a pretilt angle is preferably 20° or less for maintaining a large contrast ratio and obtaining favorable display properties.

Any appropriate nematic liquid crystals may be employed as the nematic liquid crystals depending on the purpose. For example, the nematic liquid crystals may have positive dielectric anisotropy or negative dielectric an isotropy. A specific example of the nematic liquid crystals having positive dielectric anisotropy includes "ZLI-4535" (trade name, manufactured by Merck Ltd., Japan). A specific example of the nematic liquid crystals having negative dielectric anisotropy includes "ZLI-2806" (trade name, manufactured by Merck Ltd., Japan). A difference between an ordinary refractive index (no) and an extraordinary refreactive index (ne), that is, a birefringent index ($\Delta n_{LC}$) can be appropriately selected in accordance with the response speed, transmittance, and the like of the liquid crystals. However, the birefringence is preferably 0.05 to 0.30, in general.

Any appropriate smectic liquid crystals may be employed as the smectic liquid crystals depending on the purpose. The smectic liquid crystals to be used preferably have an asymmetric carbon atom in a part of a molecular structure and exhibit ferroelectric property (also referred to as ferroelectric liquid crystals). Specific examples of the smectic liquid crystals exhibiting ferroelectric property include: p-decyloxybenzylidene-p'-amino-2-methylbutylcinnamate; p-hexyloxybenzylidene-p'-amino-2-chloropropylcinnamate; and 4-o-(2-methyl)butylresorcylidene-4'-octylaniline. Examples of commercially available ferroelectric liquid crystals include: ZLI-5014-000 (trade name, capacitance of 2.88 nF, spontaneous polarization of −2.8 C/cm$^2$, manufactured by Merck Ltd., Japan); ZLI-5014-100 (trade name, capacitance of 3.19 nF, spontaneous polarization of −20.0 C/cm$^2$, manufactured by Merck Ltd., Japan); and FELIX-008 (trade name, capacitance of 2.26 nF, spontaneous polarization of −9.6 C/cm$^2$, manufactured by Hoechst Aktiengesellschaft).

Any appropriate cell gap may be employed as the cell gap (distance between substrates) of the liquid crystal cell depending on the purpose. However, the cell gap is preferably 1.0 to 7.0 µm. A cell gap within the above range can reduce response time and provide favorable display properties.

C. Polarizer

In the specification of the present invention, the term "polarizer" refers to a film capable of converting natural light or polarized light into appropriate polarized light. Any appropriate polarizer may be employed as a polarizer used in the present invention. Preferably, a polarizer capable of converting natural light or polarized light into linearly polarized light is used.

The polarizer may have any appropriate thickness. The thickness of the polarizer is typically 5 to 80 µm, preferably 10 to 50 µm, and more preferably 20 to 40 µm. A thickness of the polarizer within the above ranges can provide excellent optical properties and mechanical strength.

A transmittance (also referred to as single axis transmittance) of the polarizer measured by using a light having a wavelength of 440 nm at 23° C. is preferably 41% or more, and more preferably 43% or more. A theoretical upper limit of the single axis transmittance is 50%. A polarization degree is preferably 99.8 to 100%, and more preferably 99.9 to 100%. A transmittance and a polarization degree within the above ranges can further increase a contrast ratio in a front direction of a liquid crystal display apparatus employing the polarizer of the present invention.

The single axis transmittance and the polarization degree can be determined by using a spectrophotometer "DOT-3" (trade name, manufactured by Murakami Color Research Laboratory). The polarization degree can be determined by: measuring a parallel transmittance ($H_0$) and a perpendicular transmittance ($H_{90}$) of the polarizer; and using the following equation. Polarization degree (%)=$\{(H_0-H_{90})/(H_0+H_{90})\}^{1/2} \times 100$. The parallel transmittance ($H_0$) refers to a transmittance of a parallel laminate polarizer produced by piling two identical polarizers such that respective absorption axes are parallel to each other. The perpendicular transmittance ($H_{90}$) refers to a transmittance of a perpendicular laminate polarizer produced by piling two identical polarizers such that respective absorption axes are perpendicular to each other. The transmittance refers to a Y value obtained through color correction by a two-degree field of view (C source) in accordance with JIS Z8701-1982.

Any appropriate polarizer may be employed as the polarizer used in the present invention depending on the purpose. Examples thereof include: a film prepared by adsorbing a dichromatic substance such as iodine or a dichromatic dye on a hydrophilic polymer film such as a polyvinyl alcohol-based film, a partially formalized polyvinyl alcohol-based film, or a partially saponified ethylene/vinyl acetate copolymer-based film and uniaxially stretching the film; and a polyene-based alignment film such as a dehydrated product of a polyvinyl alcohol-based film or a dechlorinated product of a polyvinyl-chloride-based film. Of those, a polarizer prepared by adsorbing a dichromatic substance such as iodine on a polyvinyl alcohol-based film and uniaxially stretching the film is particularly preferred because of its high polarized dichromaticity.

The polarizer prepared by adsorbing iodine on a polyvinyl alcohol-based film and uniaxially stretching the film may be produced by, for example: immersing a polyvinyl alcohol-based film in an aqueous solution of iodine for coloring; and stretching the film to a 3 to 7 times length of the original length. The aqueous solution may contain boric acid, zinc sulfate, zinc chloride, or the like as required, or the polyvinyl alcohol-based film may be immersed in an aqueous solution of potassium iodide or the like. Further, the polyvinyl alcohol-based film may be immersed and washed in water before coloring as required.

Washing the polyvinyl alcohol-based film with water not only allows removal of contamination on a film surface or washing away of an antiblocking agent, but also provides an effect of preventing unevenness such as uneven coloring by swelling of the polyvinyl alcohol-based film. The stretching of the film may be performed after coloring of the film with iodine, performed during coloring of the film, or performed before coloring of the film with iodine. The stretching may be performed in an aqueous solution of boric acid or potassium iodide, or in a water bath.

In addition to the above-described polarizer, further examples of the polarizer to be used in the present invention include: a stretched film of a polymer film containing a dichromatic substance such as iodine or a dichromatic dye; an O-type polarizer of guest/host-type prepared by aligning in a specific direction a liquid crystalline composition containing a dichromatic substance and a liquid crystalline compound (U.S. Pat. No. 5,523,863); and an E-type polarizer prepared by aligning lyotropic liquid crystals in a specific direction (U.S. Pat. No. 6,049,428).

In the liquid crystal panel of the present invention, the polarizers placed on both sides of the liquid crystal cell may be identical to or different from each other.

Referring to FIG. 2, any appropriate method may be employed as a method of arranging the first polarizer 20 and the second polarizer 20' depending on the purpose. Preferably, the first polarizer 20 and the second polarizer 20' are each provided with an adhesive layer or a pressure-sensitive adhesive layer (not shown) on a surface opposing the liquid crystal cell. Then, the first polarizer 20 is bonded to a surface of the first optical element (positive C plate) 30, and the second polarizer 20' is bonded to a surface of the third optical element (isotropic optical element) 50. In this way, contrast of a liquid crystal display apparatus employing the polarizers can be enhanced.

A thickness of the adhesive layer or pressure-sensitive adhesive layer may be appropriately determined in accordance with intended use, adhesive strength, and the like. The adhesive layer has a thickness of generally 0.1 to 50 µm, preferably 0.1 to 20 µm, and particularly preferably 0.1 to 10

μm. The pressure-sensitive adhesive layer has a thickness of generally 1 to 100 μm, preferably 5 to 80 μm, and particularly preferably 10 to 50 μm.

Any appropriate adhesive or pressure-sensitive adhesive may be employed for forming the adhesive layer or pressure-sensitive adhesive layer in accordance with the kind of adherend. In particular, in a case where a polyvinyl alcohol-based film is used for the polarizer, an aqueous adhesive is preferably used as the adhesive. An adhesive containing a polyvinyl alcohol-based resin as a main component is more preferably used. A specific example thereof is an adhesive "GOHSEFIMER Z200" (trade name, manufactured by Nippon Synthetic Chemical Industry Co., Ltd.) containing as a main component modified polyvinyl alcohol having an acetoacetyl group. An acrylic pressure-sensitive adhesive containing an acrylic polymer as a base polymer is preferably used as the pressure-sensitive adhesive from viewpoints of excellent optical transparency, appropriate pressure-sensitive adhesive properties of wettability, agglomeration property, and adhesion, and excellent weatherability and thermal resistance. A specific example thereof is a double-face optical tape "SK-2057" (trade name, manufactured by Soken Chemical & Engineering Co., Ltd.) containing an acrylic pressure-sensitive adhesive as a pressure-sensitive adhesive layer.

The first polarizer 20 is preferably placed such that its absorption axis is substantially perpendicular to an absorption axis of the opposing second polarizer 20'. With an increase in deviation from the above angle relationship of "substantially perpendicular", a contrast tends to decrease when used in a liquid crystal display apparatus.

D. First Optical Element (Positive C Plate)

In the specification of the present invention, the term "positive C plate" refers to a positive uniaxial optical element having a refractive index ellipsoid of nx>ny=nz (where, nx and ny represent main in-plane refractive indices in a slow axis direction and a fast axis direction, respectively, and nz represents a thickness direction refractive index). A positive uniaxial optical element satisfying the refractive index ellipsoid of nz>nx=ny ideally includes an optical axis in a normal direction. Herein, as described above, nx=ny also includes the case where nx and ny are substantially the same, whereas "the case where nx and ny are substantially the same" includes the case where an in-plane retardation value (Re[590]) is 10 nm or less.

Referring to FIGS. 1 and 2, the positive C plate 30 is placed between the first polarizer 20 and the second optical element (positive A plate) 40.

D-1. Optical Properties of a Positive C Plate

The positive C plate used in the present invention has Re[590] of preferably 0 to 5 nm, and more preferably 0 to 2 nm. Re[590] within the above ranges can increase a contrast ratio in an oblique direction of the liquid crystal display apparatus.

The positive C plate used in the present invention has Rth[590] of preferably −200 to −50 nm, more preferably −180 to −50 nm, particularly preferably −160 to −50 nm, and most preferably −130 to −70 nm. Rth[590] within the above ranges can increase a contrast ratio in an oblique direction of the liquid crystal display apparatus.

Re[590] and Rth[590] may be determined by using "KOBRA-21ADH" (trade name, manufactured by Oji Scientific Instruments).

Refractive indices nx, ny, and nz can be determined by: using an in-plane retardation value (Re) determined at a wavelength of 590 nm at 23° C., a retardation value (R40) determined by tilting a slow axis by 40° as a tilt angle, a thickness (d) of a retardation film, and an average refractive index (n0) of the retardation film; and using the following equations (i) to (iv) for computational numerical calculation. Then, Rth can be calculated from the equation (iv). Here, φ and ny' are represented by the following equations (v) and (vi), respectively.

$$Re = (nx - ny) \times d \quad (i)$$

$$R40 = (nx - ny') \times d / \cos(\phi) \quad (ii)$$

$$(nx + ny + nz)/3 = n_0 \quad (iii)$$

$$Rth = (nx - nz) \times d \quad (iv)$$

$$\phi = \sin^{-1}[\sin(40°)/n0] \quad (v)$$

$$ny' = ny \times nz / [ny^2 \times \sin^2(\phi) + nz^2 \times \cos^2(\phi)]^{1/2} \quad (vi)$$

In general, retardation values of a retardation film may vary depending on wavelength. This phenomenon is referred to as wavelength dispersion property of retardation film. In the specification of the present invention, the wavelength dispersion property can be determined by a ratio R40 [480]/R40 [590] of in-plane retardation values determined at a tilt angle of 40° from a normal direction by using a light having a wavelength of 480 nm and a light having a wavelength of 590 nm at 23° C. The ratio (R40[480]/R40[590]) representing wavelength dispersion properties in the positive C plate used in the present invention is referred to as "wavelength dispersion value ($D_1$)". That is, $D_1$=R40[480]/R40[590].

The above $D_1$=R40[480]/R40[590] of the positive C plate is preferably 0.70 to 1.15, more preferably 0.75 to 1.10, and particularly preferably 0.80 to 1.05. As a value decreases within the above range, a retardation value becomes constant over a wide region of visible light. Therefore, in the case of using the positive C plate in a liquid crystal display apparatus, light leakage at a particular wavelength is unlikely to occur, and the problem of a color shift in an oblique direction in a black display of the liquid crystal display apparatus can be further improved.

D-2. Means for Placing a Positive C Plate

Referring to FIGS. 1 and 2, the positive C plate 30 is placed between the first polarizer 20 and the second optical element (positive A plate) 40. As a method of placing the positive C plate 30 between the first polarizer 20 and the second optical element (positive A plate) 40, any suitable method can be adopted depending upon the purpose. Preferably, an adhesive layer or a pressure-sensitive adhesive layer (not shown) is provided on both sides of the positive C plate 30, and the first polarizer 20 and the second optical element (positive A plate) 40 are allowed to bond to each side. Thus, a contrast can be enhanced when used in a liquid crystal display apparatus.

A thickness of the adhesive layer or pressure-sensitive adhesive layer may be appropriately determined in accordance with intended use, adhesive strength, and the like. The adhesive layer has an appropriate thickness of generally 0.1 to 50 μm. The pressure-sensitive adhesive layer has an appropriate thickness of generally 1 to 100 μm.

Any appropriate adhesive or pressure-sensitive adhesive may be employed for forming the adhesive layer or the pressure-sensitive adhesive layer. Examples thereof include those each containing as a base polymer a polymer such as an acrylic polymer, a silicone-based polymer, polyester, polyurethane, polyamide, polyvinyl ether, a vinyl acetate/vinyl chloride copolymer, modified polyolefin, an epoxy-based polymer, a fluorine-based polymer, or a rubber-based polymer (such as a natural rubber-based polymer or a synthetic rubber-based polymer), which can be appropriately selected and used. Preferably, an aqueous adhesive and an acrylic pressure-sensitive adhesive similar to those used in the item C are used.

In a case where nx and ny of the positive C plate 30 are exactly equal, the positive C plate 30 exhibits no in-plane birefringence and its slow axis is not detected. Thus, the positive C plate 30 may be placed independently from an absorption axis of the first polarizer 20, a slow axis of the positive A plate 40, and an alignment direction of liquid crystal molecules in the liquid crystal cell 10. In a case where nx and ny are substantially equal to each other but are slightly different from each other, the slow axis of the positive C plate 30 may be detected. In this case, the positive C plate 30 is preferably placed such that its slow axis is substantially parallel or perpendicular to the absorption axis of the first polarizer 20. With an increase in deviation from the above angle relationship of "substantially parallel" or "substantially perpendicular", a contrast tends to decrease in the case of using the positive C plate 30 in a liquid crystal display apparatus.

D-3. Structure of a Positive C Plate

A structure (laminate structure) of the positive C plate is not particularly limited as long as the optical properties described in the item D-1 are satisfied. The positive C plate may be a single retardation film, or a laminate of two or more retardation films. The positive C plate is preferably a single retardation film for reducing shift or unevenness in retardation values due to shrinkage stress of the polarizer or heat of backlight and for reducing a thickness of a liquid crystal panel. The positive C plate as a laminate may include an adhesive layer or a pressure-sensitive adhesive layer for attaching two or more retardation films. In a case where the positive C plate as a laminate includes two or more retardation films, the retardation films may be identical to or different from each other. Details of the retardation film are described below.

Rth[590] of a retardation film used for the positive C plate can be appropriately selected in accordance with the number of retardation films to be used. For example, in a case where the positive C plate is formed of a single retardation film, Rth[590] of the retardation film is preferably equal to Rth[590] of the positive C plate. Thus, retardation of a pressure-sensitive adhesive layer, an adhesive layer, or the like used for laminating the positive C plate on the positive A plate or the polarizer is preferably as small as possible. Further, in a case where the positive C plate is a laminate including two or more retardation films, for example, the laminate is preferably designed such that total Rth[590] of the retardation films is equal to Rth[590] of the positive C plate. To be specific, a positive C plate having Rth[590] of −100 nm can be obtained by laminating two retardation films each having Rth[590] of −50 nm. Alternatively, it can also be obtained by laminating a retardation film having Rth[590] of +50 nm and a retardation film having Rth[590] of −150 nm, in which case respective slow axes are perpendicular to each other in order to decrease an in-plane retardation value. The present invention describes the cases each employing two or less retardation films for simplicity, but the present invention may obviously be applied to a laminate including three or more retardation films.

In a case where the positive C plate is formed of a single retardation film, a total thickness of the positive C plate is preferably 0.1 to 3 μm, more preferably 0.3 to 2 μm. In a case where the positive C plate is formed of two or more retardation films, a total thickness of the positive C plate is preferably 10 to 200 μm, more preferably 20 to 150 μm.

D-4. Retardation Film Used for a Positive C Plate

The retardation film used for the positive C plate is preferably a retardation film having excellent transparency, mechanical strength, thermal stability, water barrier property, and the like, and hardly causing optical unevenness due to distortion. The retardation film is preferably a solidified layer or cured layer of a homeotropically aligned liquid crystalline composition.

In the specification of the present invention, the term "homeotropically aligned" refers to a state of a liquid crystal compound contained in a liquid crystalline composition uniformly aligned parallel to a normal direction of a film. The term "solidified layer" refers to a layer obtained by cooling and solidifying a softened, molten, or solution-state liquid crystalline composition. The term "cured layer" refers to a layer obtained by cross-linking the liquid crystalline composition through heat, a catalyst, light, and/or radiation into an insoluble and infusible, or hardly soluble and hardly fusible stable state. Note that, the "cured layer" includes a cured layer obtained from a solidified layer of the liquid crystalline composition.

In the specification of the present invention, the term "liquid crystalline composition" refers to a composition having a liquid crystal phase and exhibiting liquid crystallinity. Examples of the liquid crystal phase include a nematic liquid crystal phase, a smectic liquid crystal phase, and a cholesteric liquid crystal phase. The liquid crystalline composition used in the present invention preferably has a nematic liquid crystal phase, to thereby obtain a highly transparent retardation film. The liquid crystal phase is expressed from a liquid crystal compound having in a molecular structure a mesogenic group containing a cyclic unit or the like.

A content of the liquid crystal compound in the liquid crystalline composition is preferably 40 to 100 (weight ratio), more preferably 50 to 99 (weight ratio), and particularly preferably 70 to 98 (weight ratio) with respect to a total solid content as 100. The liquid crystalline composition may contain various additives such as a leveling agent, a polymerization initiator, an aligner, a thermal stabilizer, a lubricant, a plasticizer, and an antistatic agent without inhibiting the purpose of the present invention.

Examples of the mesogenic group containing a cyclic unit or the like of the liquid crystal compound include a biphenyl group, a phenylbenzoate group, a phenylcyclohexane group, an azoxybenzene group, an azomethine group, an azobenzene group, a phenyl pyrimidine group, a diphenylacetylene group, a diphenylbenzoate group, a bicyclohexane group, a cyclohexylbenzene group, and a terphenyl group. A terminal of the cyclic unit may have a substituent such as a cyano group, an alkyl group, an alkoxy group, or a halogen group. Of those, a mesogenic group containing a cyclic unit or the like to be used preferably has a biphenyl group or a phenylbenzoate group.

The liquid crystal compound to be used preferably has at least one polymerizable functional group in a part of a molecule. Examples of the polymerizable functional group include an acryloyl group, a methacryloyl group, an epoxy group, and a vinyl ether group. Of those, an acryloyl group or a methacryloyl group is preferably used. Further, the liquid crystal compound preferably has two or more polymerizable functional groups in a part of a molecule, to thereby improve durability by a cross-linked structure formed through a polymerization reaction. A specific example of a liquid crystal compound having two polymerizable functional groups in a part of a molecule is "Paliocolor LC242" (trade name, manufactured by BASF Aktiengesellschaft).

The retardation film used for the positive C plate more preferably includes a liquid crystalline composition containing a liquid crystal compound described in JP 2002-174725 A, and is a solidified layer or cured layer obtained by homeotropically aligning the liquid crystalline composition. The retardation film used for the positive C plate particularly preferably includes a liquid crystalline composition containing a liquid crystal polymer represented by the following General Formula (1), and is a solidified layer or cured layer obtained by homeotropically aligning the liquid crystalline composition. The retardation film used for the positive C plate most preferably includes a liquid crystalline composition containing a liquid crystal polymer represented by the following General Formula (1) and a liquid crystal compound having at least one polymerizable functional group in a part of a molecule, and is a solidified layer or cured layer obtained by homeotropically aligning the liquid crystalline composition. Such a liquid crystalline composition can provide a highly transparent retardation film with excellent optical uniformity.

[Chemical Formula 1]

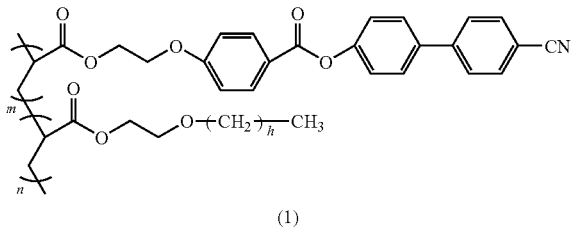

(1)

In the General Formula (1), h represents an integer of 14 to 20. When a sum of m and n is 100, m represents 50 to 70 and n represents 30 to 50.

An example of a method of obtaining a homeotropically aligned liquid crystalline composition is a method involving applying a molten product or solution of a liquid crystalline composition on a substrate subjected to alignment treatment. A preferred example thereof is a method involving applying on a substrate subjected to alignment treatment a solution (also referred to as application solution) prepared by dissolving a liquid crystalline composition in a solvent. Such a method can provide a retardation film with little alignment defects (also referred to as disclination) of the liquid crystalline composition.

The application solution may be prepared by using a commercially available solution of a liquid crystalline composition, or by adding a solvent to a commercially available solution containing a liquid crystalline composition. Alternatively, the application solution may be prepared by: dissolving a solid content of a liquid crystalline composition in various solvents; or adding various additives to a liquid crystal compound as required and adding a solvent to dissolve the additives.

A concentration of a total solid content of the application solution varies depending on a solubility, an application viscosity, wettability with respect to a base material, a thickness after application, or the like. However, the solid content is generally 2 to 100 (weight ratio), more preferably 10 to 50 (weight ratio), and particularly preferably 20 to 40 (weight ratio) with respect to the solvent as 100. A concentration thereof within the above ranges can provide a retardation film with high surface uniformity.

A liquid substance capable of uniformly dissolving a liquid crystalline composition to prepare a solution may be employed as the solvent. Examples of the solvent include: a nonpolar solvent such as benzene or hexane; and a polar solvent such as water or alcohol. Further examples of the solvent include: an inorganic solvent such as water; and an organic solvent such as alcohols, ketones, ethers, esters, aliphatic and aromatic hydrocarbons, halogenated hydrocarbons, amides, and cellosolves. The solvent is preferably at least one solvent selected from cyclopentanone, cyclohexanone, methyl isobutyl ketone, methyl ethyl ketone, toluene, ethyl acetate, and tetrahydrofuran. The solvent provides no adverse effects on the base material in practical use such as corrosion and is capable of dissolving the liquid crystalline composition sufficiently.

The base material is not particularly limited, and examples thereof that may be used include: a glass base material such as a glass sheet or a quartz substrate; a polymer base material such as a film or a plastic substrate; a metal base material such as an aluminum base material or an iron base material; an inorganic base material such as a ceramic substrate; and a semiconductor base material such as a silicon wafer. A polymer base material is particularly preferred because it is excellent in smoothness of a base material surface and wettability of a liquid crystalline composition, allows continuous production by using rollers, and may significantly improve productivity.

Examples of a material forming the polymer base material include a heat-curable resin, a UV-curable resin, a thermoplastic resin, a thermoplastic elastomer, and a biodegradable plastic. Of those, a thermoplastic resin is preferably used. The thermoplastic resin may be a noncrystalline polymer or a crystalline polymer. The noncrystalline polymer has excellent transparency, and thus has an advantage in that a retardation film (positive C plate) can be used for a liquid crystal panel or the like as it is without being peeled off from a substrate. In contrast, the crystalline polymer has excellent rigidity, strength, and chemical resistance, and thus has an advantage in that a retardation film (positive C plate) can be produced stably. Polyethylene terephthalate is most preferably used for the polymer base material because of its excellent surface uniformity, strength, chemical resistance, and production stability. Polyethylene terephthalate is generally peeled off after a homeotropically aligned liquid crystalline composition is solidified or cured.

Any appropriate alignment treatment may be selected in accordance with the kind of liquid crystal compound, the material of the base material, and the like. Specific examples thereof include: base material surface direct alignment treatment (A); base material surface indirect alignment treatment (B); and base material surface deformation alignment treatment (C). In the specification of the present invention, the term "base material surface direct alignment treatment (A)" refers to a method involving: forming a thin layer of an aligner on a base material surface through a method such as solution application (wet treatment), or plasma polymerization or sputtering (dry treatment); and adjusting an alignment direction of a liquid crystal compound in a specific direction by utilizing interaction between the aligner and the liquid crystal compound. The term "base material surface indirect alignment treatment (B)" refers to a method involving: applying a liquid crystalline composition having an aligner dissolved in advance on a base material surface; and adjusting an alignment direction of a liquid crystal compound in a specific direction by utilizing a phenomenon of the aligner permeating from the liquid crystalline composition and adsorbing on the base material surface and utilizing interaction between the aligner and the liquid crystal compound. The term "base material surface deformation alignment treatment (C)" refers to a method involving: deforming a base material surface for forming a rough surface; and adjusting an alignment direction of a liquid crystal compound in a specific direction by utilizing interaction between the rough surface and the liquid crystal compound. Of those, the base material surface direct alignment treatment (A) is preferably used in the present invention because the liquid crystal compound has excellent alignment property, to thereby provide a highly transparent retardation film with excellent optical uniformity.

Specific examples of the aligner subjected to solution application on the base material surface include lecithin, stearic acid, hexadecyltrimethylammonium bromide, octadecylamine hydrochloride, a monobasic chromium carboxylate complex (such as a chromium myristate complex or a chromium perfluorononanoate complex), and an organic silane (such as a silane coupling agent or siloxane). Specific examples of the aligner subjected to plasma polymerization on the base material surface include perfluorodimethylcyclohexane and tetrafluoroethylene. A specific example of the aligner subjected to sputtering on the base material surface is polytetrafluoroethylene. Of those, an organic silane is particularly preferably used as the aligner because of its excellent workability, product quality, and aligning ability of the liquid crystal compound. A specific example of the organic silane as the aligner is "Ethyl silicate" (trade name, manufactured by COLCOAT Co., Ltd.) containing tetraethoxysilane as a main component.

In addition to the methods described above, the aligner may be prepared by: using a commercially available aligner, or a commercially available solution or dispersion containing an aligner; adding a solvent to a commercially available aligner, or to a commercially available solution or dispersion containing an aligner; or dissolving or dispersing a solid content of an aligner in various solvents.

A method of applying the application solution on the base material surface is not particularly limited, and any appropriate application method employing a coater may be used. Specific examples of the coater include a reverse roll coater, a positive rotation roll coater, a gravure coater, a knife coater, a rod coater, a slot orifice coater, a curtain coater, a fountain coater, an air doctor coater, a kiss coater, a dip coater, a bead coater, a blade coater, a cast coater, a spray coater, a spin coater, an extrusion coater, and a hot melt coater. Of those, preferred examples of the coater used in the present invention include a reverse roll coater, a positive rotation roll coater, a gravure coater, a rod coater, a slot orifice coater, a curtain coater, a fountain coater, and a spin coater. An application method employing the above-mentioned coater can provide a very thin retardation film having excellent surface uniformity and optical uniformity.

A method of solidifying and/or curing a liquid crystalline composition may be employed as a method of fixing a homeotropically aligned liquid crystalline composition in accordance with the kind of liquid crystal compound to be used. For example, in a case where a liquid crystalline composition contains a liquid crystal polymer as a liquid crystal compound, a molten product or solution containing the liquid crystal polymer is solidified, to thereby provide sufficient mechanical strength for practical use. Meanwhile, in a case where a liquid crystalline composition contains a liquid crystal monomer as a liquid crystal compound, solidifying of a liquid crystal monomer solution may not provide sufficient mechanical strength. In this case, a polymerizable liquid crystal monomer having at least one polymerizable functional group in a part of a molecule is used, is irradiated with UV light, and is cured, to thereby provide sufficient mechanical strength for practical use.

A light source to be used for irradiation of UV light include an ultra-high pressure mercury lamp, a flash UV lamp, a high pressure mercury lamp, a low pressure mercury lamp, a deep UV lamp, a xenon lamp, a xenon flash lamp, and a metal halide lamp. UV light emitted from the light source may be non-polarized light or polarized light.

A wavelength of the light source to be used for UV irradiation may be determined in accordance with a wavelength range in which a polymerizable functional group of the liquid crystal compound to be used in the present invention has an optical absorption, but is generally 210 to 380 nm, and preferably 250 to 380 nm. A vacuum UV region of 100 to 200 nm of the light source is preferably cut through a filter or the like for suppressing a photodecomposition reaction of the liquid crystal compound. A wavelength within the above ranges allows sufficient curing of the liquid crystalline composition through a cross-linking reaction, and fixing of an alignment of the liquid crystalline composition.

An amount of UV irradiation is preferably 100 to 1,500 mJ/cm$^2$, and more preferably 100 to 800 mJ/cm$^2$. An amount of UV irradiation within the above ranges allows sufficient curing of the liquid crystalline composition through a cross-linking reaction, and fixing of an alignment of the liquid crystalline composition on the base material.

A temperature inside an irradiation device at the above-mentioned amount of UV irradiation (also referred to as irradiation temperature) is not particularly limited, but irradiation is preferably performed while the temperature is maintained equal to or lower than a liquid crystal phase-isotropic phase transition temperature (Ti) of the liquid crystalline composition to be used in the present invention. The irradiation temperature is preferably Ti-5° C. or lower, and more preferably Ti-10° C. or lower. To be specific, the irradiation temperature is preferably 15 to 90° C., and more preferably 15 to 60° C. An irradiation temperature within the above ranges allows formation of a highly uniform retardation film.

The liquid crystal phase-isotropic phase transition temperature (Ti) can be determined by: holding the liquid crystalline composition to be used in the present invention between two glass slides; placing the whole on a temperature controller, for example, "LK-600PM" (tradename, manufactured by Japan Hightech Corporation); observing the whole under heating with a polarization microscope where two polarizers are placed in a cross Nicol arrangement; and measuring a temperature providing a dark field instead of a light field.

A specific method of maintaining the irradiation temperature constant is not particularly limited, and may be appropriately selected from heating methods or temperature control methods using: an air-circulating thermostatic oven in which hot air or cool air circulates; a heater using microwaves, far infrared rays, or the like; a heated roller for temperature adjustment; a heat pipe roller; and a heated metal belt.

In the present invention, the base material having the application solution applied thereon may be subjected to drying treatment before and/or after UV irradiation. A temperature in the drying treatment (drying temperature) is not particularly limited, but is preferably within a temperature range in which the liquid crystalline composition has a liquid crystal phase. Further, the drying temperature is preferably equal to or lower than a glass transition temperature (Tg) of the base material. The drying temperature is preferably 50 to 130° C., and more preferably 80 to 100° C. A temperature within the above ranges allows formation of a highly uniform retardation film.

A time period for the drying treatment (drying time) is not particularly limited, but is 1 to 20 minutes, preferably 1 to 15 minutes, and more preferably 2 to 10 minutes for obtaining a retardation film with favorable optical uniformity.

The retardation film used for the positive C plate has a transmittance of preferably 80% or more, more preferably 85% or more, and particularly preferably 90% or more measured by using a light having a wavelength of 590 nm at 23° C. The positive C plate preferably has a similar transmittance.

The retardation film has a thickness direction birefringent index (nx−nz) of preferably −0.20 to −0.03, more preferably −0.15 to −0.05, and particularly preferably −0.12 to −0.05 determined by using a light having a wavelength of 589 nm at 23° C. A thickness direction birefringent index within the above ranges can provide a thin retardation film with little unevenness in in-plane retardation values.

The thickness of the retardation film can be selected appropriately depending upon the purpose. The thickness is preferably 0.1 to 3 μm, and more preferably 0.3 to 2 μm. The thickness in the above range can provide a retardation film with excellent in mechanical strength and display uniformity.

E. Second Optical Element (Positive A Plate)

In the specification of the present invention, the positive A plate refers to a positive uniaxial optical element in which a refractive index ellipsoid satisfies nx>ny=nz, where nx and ny represent main in-plane refractive indices in a slow axis direction and in a fast axis direction, respectively, and nz represents a thickness direction refractive index. Herein, as described above, ny=nz also includes the case where ny and nz are substantially the same. "The case where ny and nz are substantially the same" includes, for example, the case where the absolute value |Rth[590]—Re[590]| of a difference between an in-plane retardation value (Re[590]) and a thickness direction retardation value (Rth[590]) is 10 nm or less. Re[590] and Rth[590] are described later.

Referring to FIGS. 1, and 2, the positive A plate 40 is placed between the liquid crystal cell 10 and the positive C plate 30.

E-1. Optical Properties of a Positive A Plate

The positive A plate used in the present invention has Re[590] of preferably 90 to 190 nm, more preferably 100 to 180 nm, particularly preferably 120 to 170 nm, and most preferably 130 to 150 nm. Re[590] within the above ranges can enhance a contrast ratio in an oblique direction of a liquid crystal display apparatus.

In the present invention, the sum (Rth[590]+Re[590]) of Rth[590] of the first optical element (positive C plate) and Re[590] of the second optical element (positive A plate) is preferably −10 to 120 nm, more preferably 0 to 100 nm, and still more preferably 10 to 90 nm. By setting the sum in the above range, the contrast ratio in an oblique direction of a liquid crystal display apparatus can be enhanced.

The absolute value |Rth[590]−Re[590]| of a difference between Re[590] and Rth[590] of the positive A plate used in the present invention is preferably 0 to 5 nm, and more preferably 0 to 2 nm. By setting the absolute value in the above range, the contrast ratio in an oblique direction of a liquid crystal display apparatus can be enhanced.

Generally, the retardation value of the retardation film may change depending upon a wavelength. This is referred to as wavelength dispersion properties of a retardation film. In the specification of the present invention, the wavelength dispersion properties can be obtained by the ratio Re[480]/Re[590] of an in-plane retardation value measured in a normal direction with lights having wavelengths of 480 nm and 590 nm at 23° C. The ratio (Re[480]/Re[590]) representing wavelength dispersion properties in the positive A plate used in the present invention is referred to as a "wavelength dispersion value ($D_2$)". More specifically, $D_2$=Re[480]/Re[590].

$D_2$=Re[480]/Re[590] of the positive A plate is preferably 0.70 to 1.15, more preferably 0.75 to 1.10, and particularly preferably 0.80 to 1.05. As the value decreases in the above range, a retardation value becomes constant over a wide range of visible light. Therefore, in the case of using the positive A plate in a liquid crystal display apparatus, light leakage of a particular wavelength is likely to occur, and the problem of a color shift in an oblique direction in a black display of the liquid crystal display apparatus can be further improved.

E-2. Means for Placing a Positive A Plate

Referring to FIGS. 1 and 2, the positive A plate 40 is placed between the liquid crystal cell 10 and the positive C plate 30. As a method of placing the positive A plate 40 between the liquid crystal cell 10 and the positive C plate 30, any suitable method can be adopted depending upon the purpose. Preferably, an adhesive layer or a pressure-sensitive adhesive layer (not shown) is provided on both sides of the positive A plate 40, and the positive A plate 40 is bonded to the liquid crystal cell 10 and the positive C plate 30. Thus, a contrast can be enhanced in the case of use in a liquid crystal display apparatus.

The thickness of the adhesive or the pressure-sensitive adhesive can be determined appropriately depending upon the use purpose and adhesive strength, and the range of a preferred thickness of the adhesive is generally 0.1 to 50 μm. The range of a preferred thickness of the pressure-sensitive adhesive is generally 1 to 100 μm.

As the adhesive or the pressure-sensitive adhesive forming the adhesive or pressure-sensitive adhesive layer, any suitable adhesive or pressure-sensitive adhesive can be adopted. Preferably, specific examples similar to those described in the item D-2, particularly preferably, the aqueous adhesive and acrylic pressure-sensitive adhesive similar to those described in the item D-2 are used.

The positive A plate 40 is placed so that a slow axis direction thereof is substantially parallel to an absorption axis direction of the first polarizer 20. With an increase in deviation from the above angle relationship of "substantially parallel", a contrast tends to decrease in the case of using the positive A plate 40 in a liquid crystal display apparatus.

E-3. Structure of a Positive A Plate

A structure (laminate structure) of the positive A plate is not particularly limited as long as the optical properties described in the item E-1 are satisfied. The positive A plate may be a single retardation film, or a laminate of two or more retardation films. The positive A plate is preferably a single retardation film for reducing shift or unevenness in retardation values due to shrinkage stress of the polarizer or heat of backlight and for reducing a thickness of a liquid crystal panel. The positive A plate as a laminate may include an adhesive layer or a pressure-sensitive adhesive layer for attaching two or more retardation films. In a case where the positive A plate as a laminate includes two or more retardation films, the retardation films may be identical to or different from each other. Details of the retardation film are described below.

Re[590] of a retardation film used for the positive A plate can be appropriately selected in accordance with the number of retardation films to be used. For example, in a case where the positive A plate is formed of a single retardation film, Re[590] of the retardation film is preferably equal to Re[590] of the positive A plate. Thus, retardation of a pressure-sensitive adhesive layer, an adhesive layer, or the like used for laminating the positive A plate on the liquid crystal cell or the positive C plate is preferably as small as possible. Further, in a case where the positive A plate is a laminate including two or more retardation films, for example, the laminate is preferably designed such that total Re[590] of the retardation films is equal to Re[590] of the positive A plate. To be specific, a positive A plate having Re[590] of 140 nm can be obtained by laminating a retardation film having Re[590] of 70 nm so that respective slow axes are parallel to each other. The present invention describes the cases each employing two or less retardation films for simplicity, but the present invention may obviously be applied to a laminate including three or more retardation films.

The total thickness of the positive A plate is preferably 10 to 500 μm, and more preferably 20 to 400 μm. When the positive A plate has a thickness in such a range, a liquid crystal display apparatus excellent in optical uniformity can be obtained.

E-4. Retardation Film Used for a Positive A Plate

The retardation film used for the positive A plate is preferably a retardation film having excellent transparency, mechanical strength, thermal stability, water barrier property, and the like, and hardly causing optical unevenness due to distortion. A retardation film containing a thermoplastic resin as a main component is preferably used as the retardation film, and more specifically, a stretched film of a polymer film containing a thermoplastic resin as a main component is more preferably used as the retardation film. In the specification of the present invention, the term "stretched film" refers to a plastic film having enhanced alignment of molecules in a specific direction obtained by: applying tension to an unstretched film at an appropriate temperature; or applying additional tension to a film stretched in advance.

The retardation film has a transmittance of preferably 80% or more, more preferably 85% or more, and particularly preferably 90% or more measured by using a light having a wavelength of 590 nm at 23° C. A theoretical upper limit of the light transmittance is 100%, and a feasible upper limit thereof is 94%. The positive A plate preferably has a similar transmittance.

An absolute value of photoelastic coefficient C[590] (m$^2$/N) of the retardation film is preferably $2.0 \times 10^{-13}$ to $1.0 \times 10^{-10}$, more preferably $1.0 \times 10^{12}$ to $1.0 \times 10^{-10}$, and particularly preferably $1.0 \times 10^{-12}$ to $3.0 \times 10^{-11}$. An absolute value of photoelastic coefficient within the above ranges can provide a liquid crystal display apparatus with excellent display uniformity.

The retardation film may have any appropriate thickness depending on the purpose. To be specific, the thickness of the retardation film is preferably 10 to 250 μm, and more preferably 20 to 200 μm. A thickness of the retardation film within the above ranges can provide a retardation film with excellent mechanical strength and display uniformity.

Any appropriate forming processing may be employed as a method of obtaining the polymer film containing a thermoplastic resin as a main component. Any appropriate method may be selected from compression molding, transfer molding, injection molding, extrusion molding, blow molding, powder molding, FRP molding, solvent casting, and the like. Of those, extrusion molding or solvent casting is preferred because a highly smooth retardation film with favorable optical uniformity can be obtained. To be specific, the extrusion molding involves: melting a resin composition containing a thermoplastic resin as a main component, a plasticizer, an additive, and the like under heating; extruding the molten resin composition into a thin film on a surface of a casting roller by using a T-die or the like; and cooling the whole to produce a film. Further, the solvent casting involves: defoaming a rich solution (dope) prepared by dissolving in a solvent a resin composition containing a thermoplastic resin as a main component, a plasticizer, an additive, and the like; uniformly casting the defoamed solution into a thin film on a surface of an endless stainless steel belt or rotating drum; and evaporating the solvent to produce a film. Forming conditions may be appropriately selected in accordance with the composition or kind of the resin to be used, the forming processing, and the like.

The glass transition temperature (Tg) of the polymer film is not particularly limited, but it is preferably 110 to 185° C., more preferably 120 to 180° C., and particularly preferably 125 to 175° C. When Tg is 110° C. or higher, a film having satisfactory thermal stability is likely to obtained, and when Tg is 185° C. or lower, an in-plane and thickness direction retardation values are likely to be controlled by stretching. The glass transition temperature (Tg) can be obtained by a DSC method in accordance with JIS K 7121.

Examples of a material forming the thermoplastic resin include: general purpose plastics such as polyethylene, polypropylene, a norbornene-based resin, polyvinyl chloride, a cellulose-based resin (cellulose ester or the like), polystyrene, an ABS resin, an AS resin, an acrylic resin (polymethylmethacrylate or the like), polyvinyl acetate, and polyvinylidene chloride; general purpose engineering plastics such as polyamide, polyacetal, a polycarbonate-based resin, modified polyphenylene ether, polybutylene terephthalate, and polyethylene terephthalate; and super engineering plastics such as polyphenylene sulfide, polysulfone, polyethersulfone, polyetheretherketone, polyarylate, a liquid crystal polymer, polyamideimide, polyimide, and polytetrafluoroethylene. Of those, a norbornene-based resin, a cellulose-based resin (cellulose ester or the like), and a polycarbonate-based resin are preferred.

The thermoplastic resin may be used after appropriate polymer modification. Examples of the polymer modification include copolymerization, branching, cross-linking, and modifications in molecular terminals and stereoregularity. Further, two or more kinds of thermoplastic resins may be mixed and used.

The polymer film containing a thermoplastic resin as a main component may further contain any appropriate additive as required.

Specific examples of the additive include a plasticizer, a thermal stabilizer, alight stabilizer, a lubricant, an antioxidant, a UV absorber, a flame retardant, a colorant, an antistatic agent, a compatibilizing agent, a cross-linking agent, and a thickener. The kind and amount of the additive to be used may be appropriately set depending on the purpose. A use amount of the additive is typically 0.1 to 10 or less (weight ratio) with respect to a total solid content of the polymer film as 100.

The retardation film used in the positive A plate of the present invention is preferably a retardation film containing, as a main component, a norbornene-based resin, a cellulose-based resin, or a polycarbonate-based resin. More specifically, the retardation film is a stretched film of a polymer film containing, as a main component, a norbornene-based resin, a cellulose-based resin, or a polycarbonate-based resin. This is because such a film is excellent not only in transparency, mechanical strength, thermal stability, water barrier property, and the like, and but also in the expression of a retardation value, the ease of control of a retardation value, adhesion with a polarizer, and the like.

The norbornene-based resin refers to a (co)polymer obtained by using a norbornene-based monomer having a norbornene ring as a part or entirety of a starting material (monomer). Regarding the norbornene-based resin, a starting material having a norbornene ring (having a double bond in a norbornane ring) is used, and in the state of a (co)polymer, the norbornene-based resin may or may not have a norbornane ring in a constituent unit.

Examples of the norbornene-based resin not having a norbornane ring in a constituent unit in the state of a (co)polymer include a monomer to be 5-membered ring by cleavage, typically, norbornene, dicyclopentadiene, 5-phenylnorbornene, a derivative thereof, and the like.

In the case where the norbornene-based resin is a copolymer, the arrangement state of a repetition unit thereof is not particularly limited, and may be a random copolymer, a block copolymer, or a graft copolymer.

Examples of the norbornene-based resin include (A) a resin obtained by hydrogenating a ring-opened (co)polymer of a norbornene-based monomer, and (B) a resin obtained by subjecting a norbornene-based monomer to addition (co)polymerization. Note that the ring-opened (co)polymer of a norbornene-based monomer contains a resin obtained by hydrogenating a ring-opened polymer of at least one kind of a norbornene-based monomer, and α-olefins, cycloalkenes, and/or non-conjugated dienes. Further, the resin obtained by subjecting a norbornene-based monomer to addition (co)polymerization contains a resin obtained by subjecting at least one kind of norbornene-based monomer, and α-olefins, cycloalkenes, and/or non-conjugated dienes to addition copolymerization. Preferably, the retardation film used in the positive A plate contains a resin obtained by hydrogenating a ring-opened (co)polymer of a norbornene-based monomer. This is because such a retardation film is excellent in forming processability, and has high uniformity and a large retardation value.

Any appropriate monomer is selected as the norbornene-based monomer. For example, bicyclo[2.2.1]-hept-2-ene (common name: norbornene) and a derivative thereof can be used. Specific examples thereof include 5-methyl-2-bicyclo[2.2.1]-hept-2-ene, 5-ethyl-2-bicyclo[2.2.1]-hept-2-ene, 5-dimethyl-2-bicyclo[2.2.1]-hept-2-ene, 5-methyl-bicyclo[2.2.1]-hept-2-ene, 5,5-dimethyl-bicyclo[2.2.1]-hept-2-ene, 5-ethyl-bicyclo[2.2.1]-hept-2-ene, 5-propyl-bicyclo[2.2.1]-hept-2-ene, 5-butyl-bicyclo[2.2.1]-hept-2-ene, 5-methylidene-bicyclo[2.2.1]-hept-2-ene, 5-ethylidene-2-bicyclo[2.2.1]-hept-2-ene, 5-ethylidene-bicyclo[2.2.1]-hept-2-ene, 5-vinyl-bicyclo[2.2.1]-hept-2-ene, 5-propenyl-bicyclo[2.2.1]-hept-2-ene, 5-methoxycarbonyl-bicyclo[2.2.1]-hept-2-ene, 5-ethoxycarbonyl-bicyclo[2.2.1]-hept-2-ene, 5-methyl-5-methoxycarbonyl-bicyclo[2.2.1]-hept-2-ene, 5-methyl-5-ethoxycarbonyl-bicyclo[2.2.1]-hept-2-ene, 5-phenyl-bicyclo[2.2.1]-hept-2-ene, 5-cyclopentyl-bicyclo[2.2.1]-hept-2-ene, 5-cyclohexyl-bicyclo[2.2.1]-hept-2-ene, 5-benzoyloxy-5-methylbicyclo[2.2.1]-hept-2-ene, 5-trifluoromethyl-bicyclo[2.2.1]-hept-2-ene, 5,6-bis(trifluoromethyl)-bicyclo[2.2.1]-hept-2-ene, 5-benzyl-bicyclo[2.2.1]-hept-2-ene, 5-tolyl-bicyclo[2.2.1]-hept-2-ene, 5-(ethylphenyl)-bicyclo[2.2.1]-hept-2-ene, 5-(isopropylphenyl)-bicyclo[2.2.1]-hept-2-ene, 5-cyano-bicyclo[2.2.1]-hept-2-ene, bicyclo[2.2.1]-hept-5-enyl-2-propionate, bicyclo[2.2.1]-hept-5-enyl-2-methyloctanate, bicyclo[2.2.1]-hept-5-ene-5,6-dicarboxylic anhydride, and 5-hydroxymethyl-bicyclo[2.2.1]-hept-5-ene, and polar group (such as halogen)-substituted products thereof.

Tricyclo[4.3.1$^{2,5}$.0$^{1,6}$]-deca-3,7-diene (common name: dicyclopentadiene) and a derivative thereof can also be used. Specific examples thereof include 2,3-dihydro-tricyclo[4.3.1$^{2,5}$.0$^{1,6}$]-deca-3,7-diene, tricyclo[4.3.1$^{2,5}$.0$^{1,6}$]-deca-3-ene, 2-methyl-tricyclo[4.3.1$^{2,5}$.0$^{1,6}$]-deca-3-ene, and 5-methyl-tricyclo[4.3.1$^{2,5}$.0$^{1,6}$]-deca-3-ene, and polar group (such as halogen)-substituted products thereof.

Tricyclo[4.4.1$^{2,5}$.0$^{1,6}$]-undeca-3,7-diene, tricyclo[4.4.1$^{2,5}$.0$^{1,6}$]-undeca-3,8-diene, and tricyclo[4.4.1$^{2,5}$.0$^{1,6}$]-undeca-3-ene, and derivatives (such as polar group (such as halogen)-substituted products) thereof can be used.

Tetracyclo[4.4.1$^{2,5}$.1$^{7,10}$.0]-dodeca-3-ene (common name: tetracyclododecene) and a derivative thereof can also be used. Specific examples thereof include 8-methyl-tetracyclo[4.4.1$^{2,5}$.1$^{7,10}$.0]-dodeca-3-ene, 8-ethyl-tetracyclo[4.4.1$^{2,5}$.1$^{7,10}$.0]-dodeca-3-ene, 8-methylidene-tetracyclo[4.4.1$^{2,5}$.1$^{7,10}$.0]-dodeca-3-ene, 8-ethylidene-tetracyclo[4.4.1$^{2,5}$.1$^{7,10}$.0]-dodeca-3-ene, 8-vinyl-tetracyclo[4.4.1$^{2,5}$.1$^{7,10}$.0]-dodeca-3-ene, 8-propenyl-tetracyclo[4.4.1$^{2,5}$.1$^{7,10}$.0]-dodeca-3-ene, 8-methoxycarbonyl-tetracyclo[4.4.1$^{2,5}$.1$^{7,10}$.0]-dodeca-3-ene, 8-ethoxycarbonyl-tetracyclo[4.4.1$^{2,5}$.1$^{7,10}$.0]-dodeca-3-ene, 8-n-propoxycarbonyl-tetracyclo[4.4.1$^{2,5}$.1$^{7,10}$.0]-dodeca-3-ene, 8-butoxycarbonyl-tetracyclo[4.4.1$^{2,5}$.1$^{7,10}$.0]-dodeca-3-ene, 8-phenoxycarbonyl-tetracyclo[4.4.1$^{2,5}$.1$^{7,10}$.0]-dodeca-3-ene, 8-trifluoromethyl-tetracyclo[4.4.1$^{2,5}$.1$^{7,10}$.0]-dodeca-3-ene, 8-methyl-8-trifluoromethyl-tetracyclo[4.4.1$^{2,5}$.1$^{7,10}$.0]-dodeca-3-ene, 8-methyl-8-methoxycarbonyl-tetracyclo[4.4.1$^{2,5}$.1$^{7,10}$.0]-dodeca-3-ene, 8-methyl-8-ethoxycarbonyltetracyclo[4.4.1$^{2,5}$.1$^{7,10}$.0]-dodeca-3-ene, 8-methyl-8-n-propoxycarbonyltetracyclo[4.4.1$^{2,5}$.1$^{7,10}$.0]-dodeca-3-ene, 8-methyl-8-butoxycarbonyltetracyclo[4.4.1$^{2,5}$.1$^{7,10}$.0]-dodeca-3-ene, and 8-methyl-8-phenoxycarbonyltetracyclo[4.4.1$^{2,5}$.1$^{7,10}$.0]-dodeca-3-ene, and polar group (such as halogen)-substituted products thereof. The norbornene-based monomers may be used alone or in combination. The norbornene-based monomer may be used after having been subjected to any appropriate modification.

In addition, there are given octahydronaphthalene derivatives such as 1,4:5,8-dimethano-1,4,4a,5,6,7,8a-octahydronaphthalene, 6-methyl-1,4:5,8-dimethano-1,4,4a,5,6,7,8a-octahydronaphthalene, and the like.

Each of the α-olefins has preferably 2 to 20 carbon atoms, and more preferably 2 to 10 carbon atoms. Specific examples of the α-olefins include ethylene, propylene, 1-butene, 3-methyl-1-butene, 1-pentene, 3-methyl-1-pentene, 4-methyl-1-pentene, 4,4-dimethyl-1-pentene, 1-hexene, 3-methyl-1-hexene, 4,4-dimethyl-1-hexene, 4-ethyl-1-hexene, 3-ethyl-1-hexene, 1-octene, 1-decene, 1-dodecene, 1-tetradecene, 1-hexadecene, and 1-eicosene. Of those, ethylene is particularly preferred. Those α-olefins may be used alone or in combination. The α-olefins may be copolymerized with other vinyl-based monomers as required unless an effect of the present invention is impaired.

Examples of the cycloalkenes include cyclobutene, cyclopentene, cyclohexene, 3-methyl-cyclohexene, 3,4-dimethyl-cyclohexene, 2-(2-methylbutyl)-1-cyclohexene, cycloheptene, cyclooctene, 6-bromo-3-chloro-4-methylcyclohexene, 3a,5,6,7a-tetrahydro-4,7-methano-1H-indene, and 5,6-dihydrodicyclopentanediene. Those cycloalkenes may be used alone or in combination. Those cycloalkenes may be copolymerized with other vinyl-based monomers as required unless the effect of the present invention is impaired.

Examples of a disconjugate diene include 1,4-hexadiene, 4-methyl-1,4-hexadiene, 5-methyl-1,4-hexadiene, and 1,7-octadiene. Those disconjugate dienes may be used alone or in combination. Those disconjugate dienes may be copolymerized with other vinyl-based monomers as required unless the effect of the present invention is impaired.

The resin obtained through hydrogenation of the ring-opened (co)polymer of a norbornene-based monomer can be obtained by: subjecting the norbornene-based monomer or the like to a metathesis reaction to obtain a ring-opened (co)polymer; and subjecting the ring-opened (co)polymer to hydrogenation. The resin is produced through, for example: a method described in "Development and applied techniques of optical polymer materials", published by NTS Inc., p. 103 top. 111 (2003); a method described in paragraphs [0059] and [0060] of JP11-116780A; a method described in paragraphs [0035] to [0037] of JP 2001-350017 A; and a method described in paragraph [0053] of JP 2005-008698 A.

The resin obtained through addition (co)polymerization of a norbornene-based monomer can be obtained through a method described in Example 1 of JP 61-292601 A.

The norbornene-based resin which can be used in the present invention has a weight average molecular weight (Mw) of preferably 20,000 to 400,000, more preferably 30,000 to 300,000, particularly preferably 40,000 to 200,000, and most preferably 40,000 to 80,000, measured through a gel permeation chromatography (GPC) method by using a toluene solvent. The norbornene-based resin having a weight average molecular weight within the above ranges has excellent mechanical strength, and favorable solubility, formability, and operability in casting.

In a case where the norbornene-based resin is obtained through hydrogenation of the ring-opened (co)polymer of a norbornene-based monomer, a hydrogenation rate is preferably 90% or more, more preferably 95% or more, and most preferably 99% or more. The norbornene-based resin obtained at hydrogenation rate within the above ranges has excellent thermal resistance and excellent light resistance. The hydrogenation rate can be calculated by: subjecting the norbornene-based resin to $^1$H-NMR (500 MHz) measurement; and determining the hydrogenation rate from an integrated intensity ratio of paraffin-based hydrogen atoms to olefin-based hydrogen atoms.

In a case where the retardation film used for the positive A plate include the norbornene-based resin, the retardation film may contain two or more types of norbornene-based resins. The retardation film may include another thermoplastic resin in addition to the norbornene-based resin. A content (weight ratio) of the another thermoplastic resin is preferably more than 0 and 50 or less, and more preferably more than 0 and 40 or less with respect to a total solid content of the retardation film as 100. The content of the another thermoplastic resin within the above ranges can provide a retardation film having a small photoelastic coefficient, favorable wavelength dispersion properties, and excellent durability, mechanical strength, and transparency.

As the another thermoplastic resin, any suitable resin is selected depending upon the purpose. Preferably, a thermoplastic resin similar to that described in the item E-4 is used.

The another thermoplastic resin is preferably a styrene-based resin. The styrene-based resin is used for adjusting the wavelength dispersion properties or photoelastic coefficient of the retardation film. In the specification of the present invention, the term "styrene-based resin" refers to a polymer obtained by polymerizing a styrene-based monomer. Examples of the styrene-based monomer include styrene, α-methylstyrene, o-methylstyrene, p-methylstyrene, p-chlorostyrene, p-nitrostyrene, p-aminostyrene, p-carboxystyrene, p-phenylstyrene, and 2,5-dichlorostyrene.

The styrene-based resin may be a copolymer obtained through a reaction of the styrene-based monomer and another monomer. Specific examples of the copolymer include a styrene/maleimide copolymer, a styrene/maleic anhydride copolymer, and a styrene/methyl methacrylate copolymer. In a case where the styrene-based resin is a copolymer obtained through a reaction of the styrene-based monomer and another monomer, a content of the styrene-based monomer is preferably 50 mol % or more and less than 100 mol %, more preferably 60 mol % or more and less than 100 mol %, and most preferably 70 mol % or more and less than 100 mol %. The content of the styrene-based monomer within the above ranges can provide a retardation film having a small photoelastic coefficient and excellent wavelength dispersion properties.

The styrene-based resin has a weight average molecular weight (Mw) of preferably 1,000 to 400,000, and more preferably 2,000 to 300,000, measured through a gel permeation chromatography (GPC) method by using a tetrahydrofuran solvent. The styrene-based resin having a weight average molecular weight within the above ranges can have a favorable solubility or formability.

As the polycarbonate-based resin which can be used in the present invention, an aromatic polycarbonate made of an aromatic diphenol component and a carbonate component is preferably used. The aromatic polycarbonate can be usually obtained by allowing an aromatic diphenol compound to react with a carbonate precursor substance. More specifically, the aromatic polycarbonate can be obtained by a phosgene method of blowing phosgene to an aromatic diphenol compound in the presence of caustic alkali and a solvent, or an ester exchange method of subjecting an aromatic diphenol compound and bisaryl to ester exchange in the presence of a catalyst.

Specific examples of the aromatic diphenol compound include 2,2-bis(4-hydroxyphenyl)propane, 9,9-bis(4-hydroxyphenyl)fluorene, 4,4'-biphenol, 4,4'-dihydroxybiphenyl ether, 2,2-bis(3-methyl-4-hydroxyphenyl)propane, 2,2-bis(3-bromo-4-hydroxyphenyl)propane, 2,2-bis(4-hydroxy-3,5-dimethylphenyl)propane, bis(4-hydroxyphenyl)methane, 1,1-bis-(4-hydroxyphenyl)ethane, 2,2-bis(4-hydroxyphenyl)butane, 2,2-bis(4-hydroxy-3,5-dimethylphenyl)butane, 2,2-bis(4-hydroxy-3,5-dipropylphenyl)propane, 1,1-bis(4-hydroxyphenyl)cyclohexane, and 1,1-bis(4-hydroxyphenyl)3,3,5-trimethylcyclohexane. They may be used alone or in combination.

As the carbonate precursor substance, there are given phosgene, diphenols such as bischloroformate, diphenylcarbonate, di-p-tolylcarbonate, phenyl-p-tolylcarbonate, di-p-chlorophenylcarbonate, dinaphthylcarbonate, and the like. Of those, phosgene and diphenylcarboante are preferred.

The weight average molecular weight (Mw) of the polycarbonate-based resin measured by a gel permeation chromatography (GPC) method with a tetrahydrofuran solvent is preferably 25,000 to 250,000, more preferably 30,000 to 200,000, and particularly preferably 40,000 to 100,000. If the weight average molecular weight is in the above range, a polycarbonate-based resin with excellent mechanical strength and satisfactory solubility, formability, and casting operability can be obtained.

Of those, as a polycarbonate-based resin used in the positive A plate, a polycarbonate-based resin preferably containing a repetition unit (C) represented by the following Formula (2) and a repetition unit (D) represented by the following General Formula (3) having a fluorine structure is preferably used because it is excellent in wavelength dispersion properties and is likely to express a retardation value.

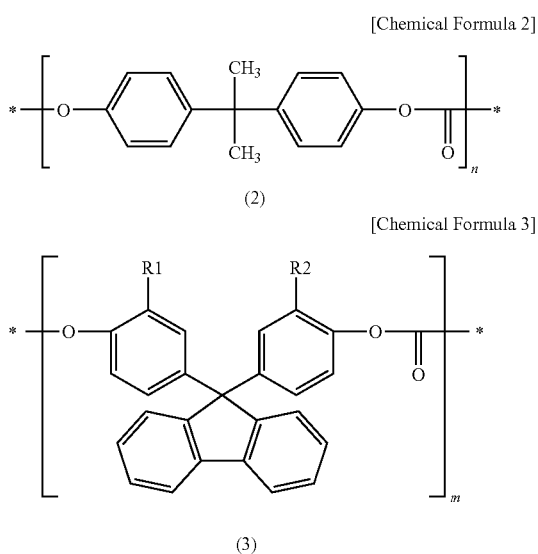

[Chemical Formula 2]

(2)

[Chemical Formula 3]

(3)

In the Formula, R1 and R2 each independently represent groups selected from hydrogen, halogen, a halogenated alkyl group, an alkyl group having 1 to 5 carbon atoms, an alkoxy group having to 5 carbon atoms, an alkoxycarbonyl group having 1 to 5 carbon atoms, an alkylcarbonyloxy group having 1 to 5 carbon atoms, and a derivative substitution thereof, and n and m represent integers of 1 or more. More preferably, R1 and R2 are alkyl groups having 1 to 5 carbon atoms, and particularly preferably, R1 and R2 are both methyl groups.

In polycarbonate containing the repetition unit (C) represented by the General Formula (2) and the repetition unit (D) represented by the General Formula (3), the ratio (C:D) of the repetition unit (C) to the repetition unit (D) is preferably 2:8 to 4:6. By setting the ratio in the above range, in the case of forming a retardation film, a retardation value becomes constant over a wide range of visible light, so the problem of a color shift in an oblique direction in a black display of a liquid crystal display apparatus can be enhanced. The ratio can be appropriately adjusted by the charging ratio of each monomer (aromatic diphenol component).

In addition, a commercially available optical film may be used as it is as the retardation film used for the positive A plate. A commercially available optical film may be subjected to fabrication such as stretching treatment and/or relaxation treatment before use. Specific examples of a commercially available norbornene-based resin film include: "ZEONEX series" (480, 480R, etc., trade name, manufactured by Zeon Corporation); "ZEONOR series" (ZF14, ZF16, etc., trade name, manufactured by Zeon Corporation); and "ARTON series" (ARTON G, ARTON F, etc., trade name, manufactured by JSR Corporation). Specific examples of a commercially available carbonate-based resin film include: "Pureace series" (trade name, manufactured by Teijin Ltd.); "Elmech series" (R140, R435, etc., trade name, manufactured by Kaneka Corporation); and "Illuminex series" (trade name, manufactured by GE Plastics Japan, Ltd.).

As a method of forming a stretched film of a polymer film containing, as a main component, the thermoplastic resin, any suitable stretching method can be adopted. Specific examples thereof include a longitudinal uniaxial stretching method, a lateral uniaxial stretching method, a longitudinal and lateral simultaneous biaxial stretching method, and a longitudinal and lateral sequential biaxial stretching method. As the stretching means, any suitable stretching machine such as a roll stretching machine, a tenter stretching machine, and a biaxial stretching machine can be used. In the case of stretching while heating, a temperature may be changed continuously or gradually. The stretching process may be divided into two or more steps. Preferably, the longitudinal uniaxial stretching method or the lateral uniaxial stretching method is used. This is because the longitudinal uniaxial stretching method or the lateral uniaxial stretching method can provide a retardation film with a small variation in a slow axis in a film width direction is obtained. Further, the longitudinal uniaxial stretching method is suitable for enhancing the uniaxial property of molecules (is likely to arrange the alignment direction of molecules in one direction), so this method has a feature in obtaining a large retardation value even with a material that is unlikely to produce a retardation value.

The temperature (which is also referred to as stretching temperature) inside a stretching oven when stretching the polymer film is preferably equal to or higher than a glass transition temperature (Tg) of the polymer film, because a retardation value is likely to become uniform in a width direction and a film is unlikely to be crystallized (whitish). The stretching temperature is preferably Tg+1° C. to Tg+30° C. The stretching temperature is preferably 110 to 200° C. and more preferably 120 to 180° C.

Regarding a specific method of keeping the temperature inside the stretching oven constant, it is not particularly limited and any suitable method is selected from a heating method or a temperature control method, such as an air circulation constant temperature oven in which hot air or cool air circulates, a heater using a microwave, infrared light, or the like, a roll heated for regulating a temperature, a heat pipe roll, or a metal belt.

The stretching ratio for stretching the polymer film is determined from the composition of the polymer film, the kind of a volatile component and the like, the residual amount of a volatile component and the like, a retardation value to be designed, and the like, and is not particularly limited, but it is preferably 1.05 to 2.00 times, for example. Further, although there is no particular limit to the feed speed during stretching, it is preferably 0.5 to 20 m/min in terms of the mechanical precision, stability, and the like of a stretching apparatus.

F. Third Optical Element (Isotropic Optical Element)

Referring to FIGS. 1 and 2, the isotropic optical element 50 is placed between the liquid crystal cell 10 and the second polarizer 20'. In this form, the isotropic optical element 50 serves as a protective layer on a liquid crystal cell side of the polarizer and prevents deterioration of the polarizer, to thereby maintain high display properties of the liquid crystal display apparatus for a long period of time.

In the specification of the present invention, the term "isotropic optical element" refers to an optical element satisfying a refractive index profile of nx=ny=nz, where nx and ny represent main in-plane refractive indices and nz represents a thickness direction refractive index. Herein, as described above, nx=ny=nz includes the case where nx, ny, and nz are substantially the same. "The case where nx, ny, and nz are substantially the same" includes, for example, the case where an in-plane retardation value (Re[590]) is 10 nm or less, and a thickness direction retardation value (Rth[590]) is 10 nm or less.

F-1. Optical Properties of an Isotropic Optical Element

Re[590] of the isotropic optical element used in the present invention is preferably as small as possible for increasing contrast ratios in a front direction and an oblique direction of the liquid crystal display apparatus. Re[590] is preferably 5 nm or less, and most preferably 3 nm or less.

Rth[590] of the isotropic optical element is preferably as small as possible for increasing a contrast ratio in an oblique direction of the liquid crystal display apparatus. Rth[590] is preferably 7 nm or less, and most preferably 5 nm or less. Rth[590] within the above ranges can eliminate adverse effects of Rth on display properties of the liquid crystal display apparatus.

F-2. Means for Placing an Isotropic Optical Element

Referring to FIG. 2, any appropriate method may be employed as a method of placing the isotropic optical element 50 between the liquid crystal cell 10 and the second polarizer 20' depending on the purpose. The isotropic optical element 50 is preferably bonded to the liquid crystal cell 10 and the second polarizer 20' by providing an adhesive layer or a pressure-sensitive adhesive layer (not shown) on both sides of the isotropic optical element 50. In this way, contrast of a liquid crystal display apparatus employing the isotropic optical element 50 can be increased.

A thickness of the adhesive layer or the pressure-sensitive adhesive layer may be appropriately determined in accordance with intended use, adhesive strength, and the like, and is generally 1 to 500 μm.

Any appropriate adhesive or pressure-sensitive adhesive may be employed for forming the adhesive layer or the pressure-sensitive adhesive layer. Preferably, the specific examples similar to those described in the item D-2, and particularly preferably, the aqueous adhesive and the acrylic pressure-sensitive adhesive similar to those described in the item D-2 are used.

In the case where nx and ny are exactly the same, the isotropic optical clement 50 does not generate birefringence in a plane, so that a slow axis is not detected. Thus, the isotropic optical element 50 can be placed irrespective of the absorption axis of the second polarizer 20'. In the case where nx and ny are slightly different even when nx and ny are substantially the same, a slow axis may be detected. In this case, preferably, the isotropic optical element 50 is placed so that a slow axis thereof is substantially parallel or perpendicular to the absorption axis of the second polarizer 20'. With an increase in deviation from the above angle relationship of "substantially parallel" or "substantially perpendicular", a contrast tends to decrease in the case of using the isotropic optical element 50 in a liquid crystal display apparatus.

F-3. Structure of an Isotropic Optical Element

A structure (laminate structure) of the isotropic optical element is not particularly limited as long as the optical properties as described in the item F-1 are satisfied. To be specific, the isotropic optical element may be a single optical film, or a laminate of two or more optical films. The isotropic optical element as a laminate may include an adhesive layer or a pressure-sensitive adhesive layer for attaching the optical films. The optical film may be an isotropic film or a retardation film as long as the isotropic optical element has substantially optical isotropy. In a case where the isotropic optical element as a laminate includes two retardation films, the retardation films are preferably placed such that the respective slow axes are perpendicular to each other, to thereby reduce in-plane retardation values. Further, the retardation films having opposite signs of thickness direction retardation values are preferably laminated, to thereby reduce thickness direction retardation values.

A total thickness of the isotropic optical element is preferably 10 to 200 μm, more preferably 15 to 150 μm, and particularly preferably 20 to 100 μm. A thickness within the above ranges can provide an isotropic optical element with excellent optical uniformity.

F-4. Optical Film Used for an Isotropic Optical Element

The optical film used for the isotropic optical element is preferably an isotropic film. In the specification of the present invention, the term "isotropic film" refers to a film having a small difference in optical properties in three-dimensional directions and having substantially no anisotropic optical properties such as birefringence. Note that the phrase "having substantially no anisotropic optical properties" indicates that isotropy includes a case of having slight birefringence but providing no adverse effects on display properties of a liquid crystal display apparatus in practical use.

Any appropriate method may be employed as a method of obtaining the isotropic film. Specific examples thereof include extrusion, solvent casting, and inflation. Extrusion is preferably used for forming of an isotropic film.

The material forming the isotropic film to be used is preferably a optical film containing, as a main component, a norbornene-based resin, a cellulose-based resin (cellulose ester or the like), or an acrylic resin (polymethylmethacrylate or the like), from the viewpoints of excellent transparency, mechanical strength, thermal stability, and water barrier property, small absolute value of photoelastic coefficient, and excellent adhesion with the polarizer.

The isotropic film used for the isotropic optical element has a transmittance of preferably 80% or more, more preferably 85% or more, and particularly preferably 90% or more measured by using a light having a wavelength of 590 nm at 23° C. The isotropic optical element preferably has a similar transmittance.

An absolute value of photoelastic coefficient C[590] (m$^2$/N) of the isotropic film is preferably $1.0 \times 10^{-12}$ to $8.0 \times 10^{-11}$, more preferably $1.0 \times 10^{-12}$ to $5.0 \times 10^{-11}$, and particularly preferably $1.0 \times 10^{-12}$ to $2.0 \times 10^{-11}$. An absolute value of photoelastic coefficient within the above ranges can provide a liquid crystal display apparatus with excellent display uniformity.

The isotropic film may have any appropriate thickness depending on the purpose. The thickness of the isotropic film is preferably 10 to 100 μm, more preferably 10 to 80 μm, and particularly preferably 10 to 50 μm. A thickness within the above ranges can provide an isotropic film with excellent mechanical strength and display uniformity.

G. Liquid Crystal Display Apparatus

Figure 3:
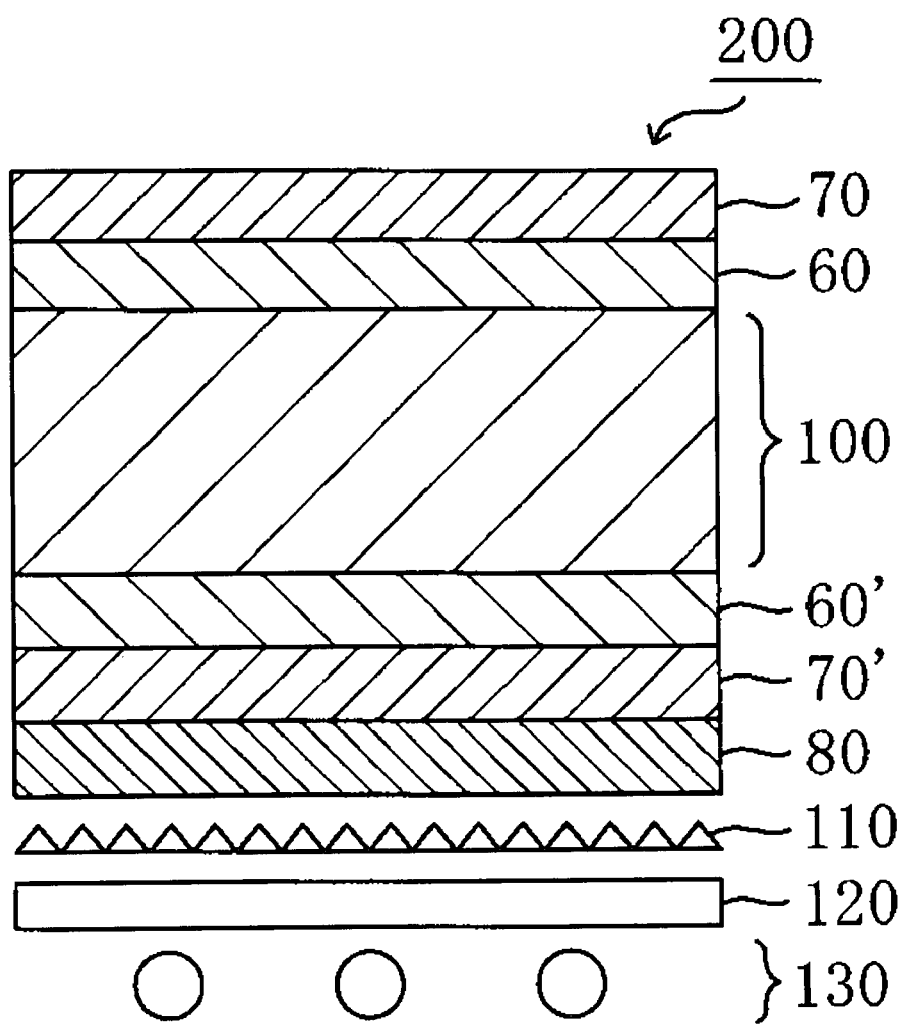
FIG. 3 is a schematic cross-sectional view of a liquid crystal display apparatus according to the preferred embodiment of the present invention.

FIG. 3 is a schematic cross-sectional view of a liquid crystal display apparatus according to a preferred embodiment of the present invention. A liquid crystal display apparatus 200 is provided with a liquid crystal panel 100 of the present invention, protective layers 60 and 60' placed on both sides of the liquid crystal panel 100, surface treated layers 70 and 70, placed on outer sides of the protective layers 60 and 60', a brightness enhancement film 80 placed on an outer side (backlight side) of the surface treated layer 70', a prism sheet 110, a light guide plate 120, and lamp 130. As the surface treated layers 70 and 70', treated layers subjected to hard coat treatment, antireflection treatment, anti-sticking treatment, diffusion treatment (also referred to as anti-glare treatment), or the like is used. As the brightness enhancement film 80, a polarization separation film having a polarization selection layer "D-BEF series" (trade name, manufactured by Sumitomo 3M Limited, for example) or the like is used. The above-described optical members are used, to thereby obtain a display apparatus with better display properties. According to another embodiment, the optical members shown in FIG. 3 may be partly omitted or replaced by other members in accordance with the drive mode or intended use of the liquid crystal cell to be used as long as the present invention is satisfied.

The maximum value of tristimulus values Y defined in a CIE1931XYZ display system at a polar angle of 60° and an azimuth angle of 0° to 360° in the case of displaying a black image in the liquid crystal display apparatus of the present invention is preferably 1.5 or less, more preferably 1.3 or less, still more preferably 1.2 or less, and particularly preferably 1.1 or less. When the maximum value of the tristimulus values Y is in the above range, a liquid crystal display apparatus whose contrast and display color are unlikely to change depending upon a viewing angle and an azimuth can be constituted sufficiently.

The difference between the maximum value and the minimum value of the tristimulus values Y defined in a CIE1931 XYZ display system at a polar angle of 60° and an azimuth angle of 0° to 360° in the case of displaying a black image in the liquid crystal display apparatus of the present invention is preferably 1.0 or less, more preferably 0.9 or less, still more preferably 0.8 or less, and particularly preferably 0.7 or less. When the difference between the maximum value and the minimum value of the tristimulus values Y is in the above range, a liquid crystal display apparatus whose contrast and display color are unlikely to change depending upon a viewing angle and an azimuth can be constituted sufficiently.

The maximum value of a color shift amount $\Delta E$ in an oblique direction calculated from a brightness $L^*$ and color coordinates $a^*$ and $b^*$ defined in a CIE1976$L^*a^*b^*$ color space at a polar angle of 60° and an azimuth angle of 0° to 360° in the case of displaying a black image in the liquid crystal display apparatus of the present invention is preferably 35 or less, more preferably 33 or less, still more preferably 31 or less, and particularly preferably 30 or less. When the maximum value of the color shift amount $\Delta E$ is in the above range, a liquid crystal display apparatus whose contrast and display color is unlikely to change depending upon the viewing angle and an azimuth can be constituted sufficiently.

The difference between the maximum value and the minimum value of a color shift amount $\Delta E$ in an oblique direction calculated from a brightness $L^*$ and color coordinates $a^*$ and $b^*$ defined in a CIE1976$L^*a^*b^*$ color space at a polar angle of 60° and an azimuth angle of 0° to 360° in the case of displaying a black image in the liquid crystal display apparatus of the present invention is preferably 30 or less, more preferably 27 or less, still more preferably 26 or less, and particularly preferably 25 or less. When the difference between the maximum value and the minimum value of the color shift amount $\Delta E$ is in the above range, a liquid crystal display apparatus whose contrast and display color is unlikely to change depending upon a viewing angle and an azimuth can be constituted sufficiently.

In the liquid crystal display apparatus of the present invention, light leakage is small, a screen does not become whitish, and a color shift is small even when viewed from any azimuth (azimuth angle of 0° to 360°) in an oblique direction.

H. Intended Use of a Liquid Crystal Panel of the Present Invention

The intended use of the liquid crystal panel and liquid crystal display apparatus of the present invention is not particularly limited, but the liquid crystal panel and the liquid crystal display apparatus of the present invention may be used for various purposes such as: office automation (OA) devices such as a personal computer monitor, a laptop personal computer, and a copying machine; portable devices such as a cellular phone, a watch, a digital camera, a personal digital assistance (PDA), and a portable game machine; domestic electric appliances such as a video camera, a liquid crystal television, and a microwave; in-car devices such as a back monitor, a car navigation system monitor, and a car audio; display devices such as a commercial information monitor; security devices such as a surveillance monitor; and nursing care/medical devices such as a nursing monitor and a medical monitor.

The liquid crystal panel and the liquid crystal display apparatus of the present invention are particularly preferably used for a large liquid crystal television. A liquid crystal television employing the liquid crystal panel and the liquid crystal display apparatus of the present invention has a screen size of preferably wide 17-inch (373 mm×224 mm) or more, more preferably wide 23-inch (499 mm×300 mm) or more, particularly preferably wide 26-inch (566 mm×339 mm) or more, and most preferably wide 32-inch (687 mm×412 mm) or more.

The present invention will be described in more detail by using the following examples and comparative examples. However, the present invention is not limited to the examples. Analysis methods used in the examples are described below.

(1) Method of Determining a Single Axis Transmittance, a Polarization Degree, a Hue a Value, and a Hue b Value of a Polarizer:

The single axis transmittance and the polarization degree were determined at 23° C. by using a spectrophotometer "DOT-3" (trade name, manufactured by Murakami Color Research Laboratory).

(2) Method of Determining a Molecular Weight:

The molecular weight was calculated through gel permeation chromatography (GPC) by using polystyrene as a standard sample. To be specific, the molecular weight was determined under the following measurement conditions by using the following apparatus and instruments.

Sample for determination: a filtrate obtained by dissolving a sample in tetrahydrofuran to make 0.1 wt % solution, leaving the solution standing still overnight, and filtering the solution by a 0.45 μm membrane filter Analyzer: "HLC-8120GPC", manufactured by Tosoh Corporation Column: TSKgel SuperHM-H/H4000/H3000/H2000

Column size: 6.0 mm I.D.×150 mm

Eluant: tetrahydrofuran

Flow rate: 0.6 ml/minute

Detector: R1

Column temperature: 40° C.

Injection amount: 20 μl (3) Method of Measuring a Thickness:

A thickness of less than 10 μm was measured by using a thin film thickness spectrophotometer "Multichannel photodetector MCPD-2000" (trade name, manufactured by Otsuka Electronics Co., Ltd.). A thickness of 10 μm or more was measured by using a digital micrometer "KC-351C-type" (trade name, manufactured by Anritsu Corporation).

(4) Method of Measuring an Average Refractive Index of a Film:

The average refractive index of the film was determined by measuring refractive indices by using an Abbe refractometer "DR-M4" (trade name, manufactured by Atago Co., Ltd.) by using a light having a wavelength of 589 nm at 23° C.

(5) Method of Measuring Retardation Values (Re[480], Re[590], R40[480], R40[590], R40[630], Rth[590]):

The retardation values were measured by using a "KOBRA21-ADH" (trade name, manufactured by Oji Scientific Instruments) by using lights having wavelengths of 480 nm and 590 nm at 23° C.

(6) Method of Measuring a Transmittance (T[590]):

The transmittance was measured by using a UV-vis spectrophotometer "V-560" (trade name, manufactured by JASCO Corporation) by using a light having a wavelength of 590 nm at 23° C.

(7) Method of Measuring an Absolute Value (C[590]) of a Photoelastic Coefficient:

The retardation values (23° C./wavelength of 590 nm) at a center of a sample having a size of 2 cm×10 cm were measured under stress (5 to 15 N) by using a spectroscopic ellipsometer "M-220" (trade name, manufactured by JASCO Corporation) while both ends of the sample were held, and the absolute value (C[590]) was calculated from a slope of a function of the stress and the retardation values.

(8) Method of Measuring a Light Leakage Amount (Y) of a Liquid Crystal Display Apparatus:

After an elapse of 30 minutes from lighting of a light in a dark room at 23° C., tristimulus values Y defined in a CIE1931XYZ display system at an azimuth angle of 0° to 360° and a polar angle of 60° of a screen displaying a black image were measured, using "EZContrast160D" (trade name, manufactured by ELDIM). The long side direction of the liquid crystal panel was defined as an azimuth angle of 0°, and the normal direction was defined as a polar angle of 0°.

(9) Method of Measuring a Color Shift Amount (ΔE) of a Liquid Crystal Display Apparatus:

After an elapse of 30 minutes from lighting of a light in a dark room at 23° C., a brightness L* and color coordinates a* and b* defined in a CIE1976L*a*b* color space at an azimuth angle of 0° to 360° ad a polar angle of 60° of a screen displaying a black image were measured, using "EZContrast160D" (trade name, manufactured by ELDIM). A color shift amount (ΔE) in an oblique direction was calculated from an expression: $\{(L^*)^2+(a^*)^2+(b^*)^2\}^{1/2}$.

REFERENCE EXAMPLE 1

Production of a Polarizer

A polymer film "9P75R" (trade name, thickness: 75 μm, average degree of polymerization: 2,400, saponification degree: 99.9 mol %, manufactured by Kuraray Co., Ltd.) containing polyvinyl alcohol as a main component was uniaxially stretched 2.5 times by using a roll stretching machine while the polymer film was colored in a coloring bath maintained at 30° C.±3° C. and containing iodine and potassium iodide. Next, the polymer film was uniaxially stretched to a 6 times length of the original length of the polyvinyl alcohol film in an aqueous solution maintained at 60° C.±3° C. and containing boric acid and potassium iodide while a cross-linking reaction was performed. The obtained film was dried in an air circulating thermostatic oven at 50° C.±1° C. for 30 minutes, to thereby obtain polarizers P1 and P2. Optical properties of the polarizers P1 and are as shown in Table 1.

TABLE 1

|  | Reference Example 1 |
| --- | --- |
| Polarizer | P1, P2 |
| Thickness (μm) | 28 |
| Single axis transmittance (%) | 44.1 |
| Parallel transmittance (%) | 39.0 |
| Perpendicular transmittance (%) | 0.02 |
| Polarization degree (%) | 99.95 |
| Hue a value | −1.4 |
| Hue b value | 3.4 |

REFERENCE EXAMPLE 2

Production of a First Optical Element: Retardation Film 1-A 5 parts by weight of a polymer liquid crystal (weight average molecular weight: 5,000) represented by the following Formula (4), 20 parts by weight of a columitic liquid crystal compound ("PaliocolorLC242" (ne=1.654, no=1.523) manufactured by BASF Japan Ltd.) having two polymerizable functional groups in a part of a molecular structure, and 1.25 parts by weight of a photopolymerization initiator ("Irgacure 907" (trade name) manufactured by Ciba Specialty Chemicals Inc.) were dissolved in 75 parts by weight of cyclohexanone to prepare a solution of a liquid crystalline composition. The solution was applied to the surface of a polymer film ("ZEONOA ZF-14" (thickness: 100 μm) (trade name) manufactured by Optis Corporation) containing, as a main component, a commercially available norbornene-based resin using a die coater, and dried in an air circulation constant temperature oven at 80° C.±1° C. for 2 minutes, followed by cooling gradually to room temperature (23° C.), whereby a solidified layer of a homeotropically aligned liquid crystalline composition was formed on the surface of the polymer film. Then, the solidified layer was irradiated with UV light (under an air atmosphere) in an irradiation light amount of 400 mJ/cm², whereby the columitic liquid crystal compound was cured by a polymerization reaction. The polymer film was peeled, whereby a cured layer of a liquid crystalline composition containing a homeotropically aligned columitic liquid crystal compound was obtained. The cured layer was used as a retardation film 1-A. Table shows the properties of the retardation film 1-A.

[Chemical Formula 4]

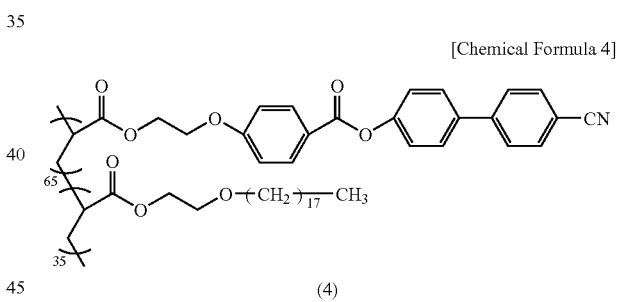

(4)

REFERENCE EXAMPLE 3

Production of a First Optical Element: Retardation Film 1-B

A retardation film 1-B was produced in the same way as in Reference Example 2 except for changing the application thickness of a solution of a liquid crystalline composition. Table 2 shows the properties of the retardation film 1-B.

REFERENCE EXAMPLE 4

Production of a First Optical Element: Retardation Film 1-C

A retardation film 1-C was produced in the same way as in Reference Example 2 except for changing the application thickness of a solution of a liquid crystalline composition. Table 2 shows the properties of the retardation film 1-C.

REFERENCE EXAMPLE 5

Production of a Laminate of the First Optical Element and the Negative C Plate: Retardation Film 1-D The retardation film 1-B produced in Reference Example 3 was laminated on the surface of a commercially available polymer film containing triacetylcellulose as a main component having a thickness direction retardation value (Rth[590]) of 40 nm (negative C plate) ("Fujitac UZ" (trade name) manufactured by Fuji Photo Film Co., Ltd.) via an adhesive layer to produce a retardation film (laminate) 1-D. Table 2 shows the properties of the retardation film (laminate) 1-D.

REFERENCE EXAMPLE 6

Production of a Laminate of the First Optical Element and the Negative C Plate: Retardation Film 1-E The retardation film 1-C produced in Reference Example 4 was laminated on the surface of a commercially available polymer film containing triacetylcellulose as a main component having a thickness direction retardation value (Rth[590]) of 40 nm (negative C plate)("Fujitac UZ" (trade name) manufactured by Fuji Photo Film Co., Ltd.) via an adhesive layer to produce a retardation film (laminate) 1-E. Table 2 shows the properties of the retardation film (laminate) 1-E.

REFERENCE EXAMPLE 7

Production of a Laminate of the First Optical Element and the Negative C Plate: Retardation Film 1-F A retardation film having a thickness direction retardation value (Rth[590]) of −140 nm produced in the same way as in Reference Example 2 except for changing the application thickness of a solution of a liquid crystalline composition was laminated on the surface of a commercially available polymer film containing triacetylcellulose as a main component having a thickness direction retardation value (Rth[590]) of 40 nm (negative C plate) ("Fujitac UZ" (trade name) manufactured by Fuji Photo Film Co., Ltd.) via an adhesive layer to produce a retardation film (laminate) 1-F. Table 2 shows the properties of the retardation film (laminate) 1-F.

REFERENCE EXAMPLE 8

Production of a Second Optical Element: Retardation Film 2-A

A resin hydrogenated with a ring-opened polymer of a norbornene-based monomer (ZEONOA ZF14 (100 μm, Tg=136° C.) manufactured by Optis Corporation) was stretched 1.25 times in a lengthwise direction in an air circulation oven at 135° C. with a roll stretching machine to produce a retardation film 2-A. Table shows the properties of the retardation film 2-A.

TABLE 3

| | Reference Example 8 |
|---|---|
| Retardation film | 2-A |
| Refractive index ellipsoid | nx > ny = nz |
| Thickness (μm) | 88 |
| Transmittance (%) | 92 |
| Re[590] (nm) | 140 |
| Rth[590] (nm) | 140 |
| Nz coefficient | 1.0 |
| Re[480]/Re[590] | 1.02 |
| Re[590]/Re[630] | 0.99 |
| Absolute value of photoelastic coefficient $C \times 10^{-12}(m^2/N)$ | 3.1 |

REFERENCE EXAMPLE 9

Production of a Third Optical Element: Optical Film 3-A

A commercially available polymer film containing cellulose-based resin as a main component ("Fujitac ZRF80S" (trade name) manufactured by Fuji Photo Film Co., Ltd.) was used as it is as an optical film 3-A. The optical film 3-A has Re[590]=0 nm and Rth[590]=2 nm and has isotropy substantially optically.

REFERENCE EXAMPLE 10

Production of a Liquid Crystal Cell

A liquid crystal panel was removed from a liquid crystal display apparatus including an IPS mode liquid crystal cell (32V-type wide liquid crystal television "FACE (Type No:

TABLE 2

| | Reference Example 2 | Reference Example 3 | Reference Example 4 | Reference Example 5 | Reference Example 6 | Reference Example 7 |
|---|---|---|---|---|---|---|
| Retardation film (laminate) | 1-A | 1-B | 1-C | 1-D | 1-E | 1-F |
| Refractive index ellipsoid | nz > nx = ny | nz > nx = ny | nz > nx = ny | Laminate of nz > nx = ny and nx = ny > nz | Laminate of nz > nx = ny and nx = ny > nz | Laminate of nz > nx = ny and nx = ny > nz |
| Thickness (μm) | 0.8 | 1.0 | 1.2 | 44.0 | 44.2 | 44.4 |
| Transmittance (%) | 92 | 92 | 92 | 91 | 91 | 91 |
| Re[590] (nm) | 0.1 | 0.3 | 0.2 | 0.3 | 0.3 | 0.2 |
| Rth[590] (nm) | −80 | −100 | −120 | −60 | −80 | −100 |
| R40[480]/R40[590] | 1.05 | 1.05 | 1.05 | — | — | — |
| R40[590]/R40[630] | 0.99 | 0.99 | 0.99 | — | — | — |

32LC100)" (trade name), screen size: 697 mm×392 mm, manufactured by Toshiba Corporation), all optical films placed on upper and lower sides of the liquid crystal cell were removed, and glass surfaces (front and back sides) of the liquid crystal cell were washed. A liquid crystal cell thus produced was used as a liquid crystal cell A.

EXAMPLE 1

Production of a Liquid Crystal Panel A and a Liquid Crystal Display Apparatus A

The retardation film 2-A obtained in Reference Example 8 was attached, as a second optical element, to the surface on a viewer side of the liquid crystal cell A obtained in Reference Example 10 via an acrylic pressure-sensitive adhesive layer (thickness: 23 µm) so that a slow axis direction thereof was substantially parallel (0°±0.5°) to a long side direction of the liquid crystal cell A. Then, a retardation film 1-B obtained in Reference Example 3 was attached, as a first optical element, to the surface of the retardation film 2-A via an acrylic pressure-sensitive adhesive layer (thickness: 23 µm). Then, the polarizer P1 obtained in Reference Example 1 was attached, as a first polarizer, to the surface of the retardation film 1-B via an adhesive layer (thickness: 1 µm) so that an absorption axis direction thereof was substantially parallel (0°±0.5°) to the long side direction of the liquid crystal cell A. At this time, the initial alignment direction of the liquid crystal cell A, and the slow axis direction of the retardation film 2-A (second optical element) and the absorption axis direction of the polarizer P1 (first polarizer) are substantially perpendicular to each other.

Next, the optical film 3-A obtained in Reference Example 9 was attached, as a third optical element, to the surface on a backlight side of the liquid crystal cell A via an acrylic pressure-sensitive adhesive layer (thickness: 23 µm). Subsequently, the polarizer P2 obtained in Reference Example 1 was attached, as a second polarizer, to the surface of the optical film 3-A via an adhesive layer (thickness: 1 µm) so that an absorption axis direction thereof was substantially perpendicular (90°±0.5°) to the long side direction of the liquid crystal cell A. At this time, the absorption axis direction of the polarizer P1 and the absorption axis direction of the polarizer P2 are substantially perpendicular to each other. Further, the initial alignment direction of the liquid crystal cell A and the absorption axis direction of the polarizer P2 (second polarizer) are substantially parallel to each other. On outer sides (sides opposite to the liquid crystal cell) of polarizers P1 and P2, triacetylcellulose film (Fujitac UZ (thickness: 80 µm) manufactured by Fuji Photo Film Co., Ltd.) were each attached as protective layers via adhesive layers (thickness: 1 µm).

Figure 4:
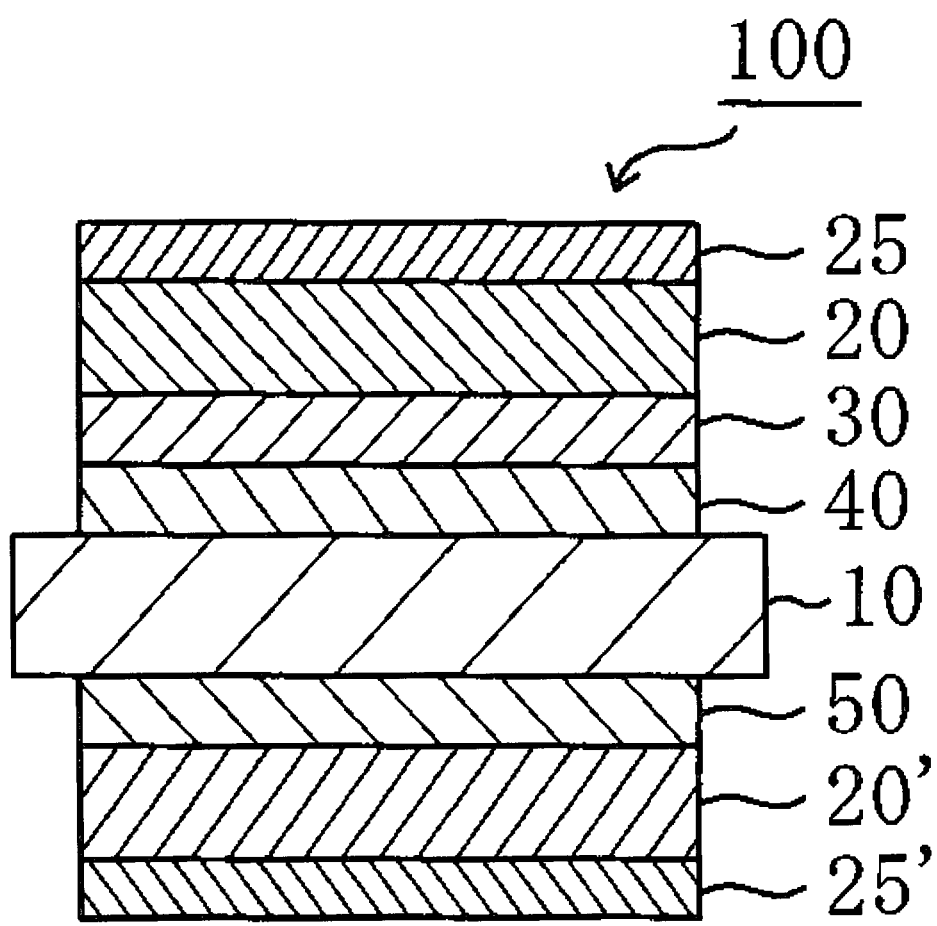
FIG. 4 is a schematic cross-sectional view of a liquid crystal panel obtained in Examples 1, 2, and 3, and Comparative Example 1.
Figure 10:
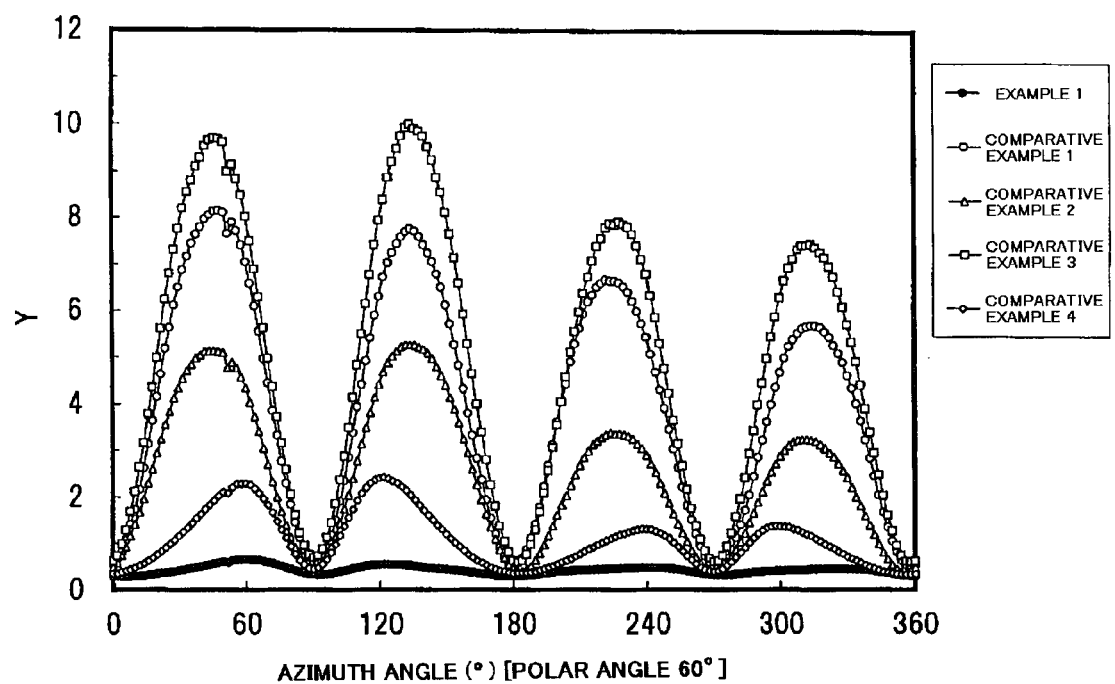
FIG. 10 is a graph showing a change in tristimulus values Y at an azimuth angle of 0° to 360° and a polar angle of 60° in a liquid crystal display apparatus.
Figure 11:
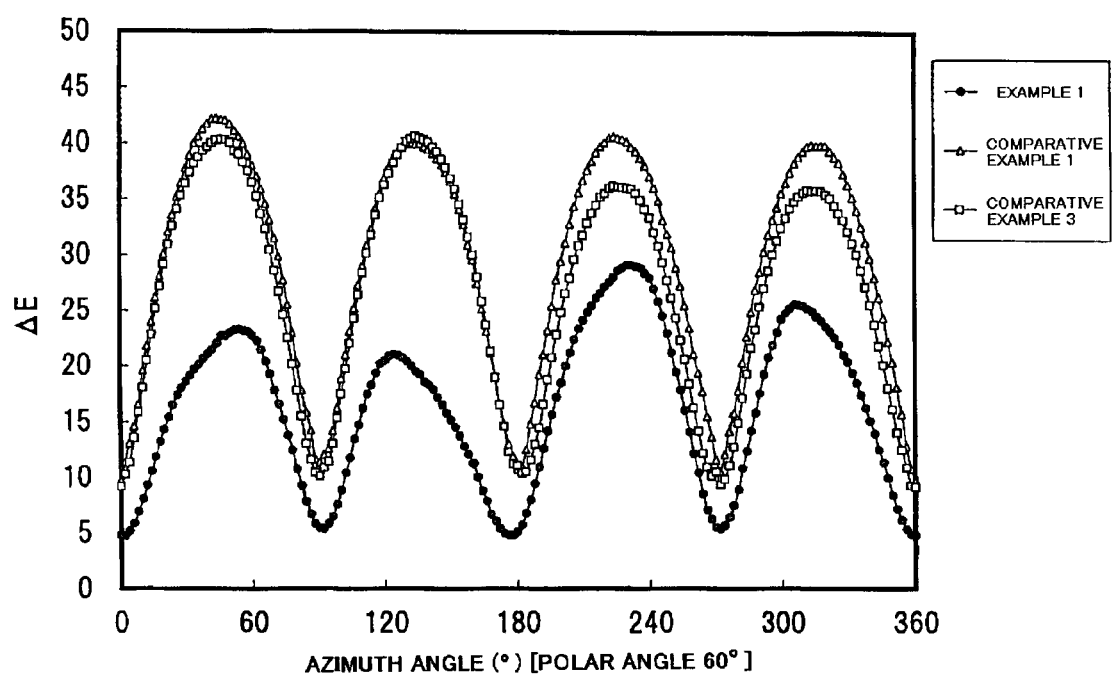
FIG. 11 is a graph showing a change in a color shift amount ΔE at an azimuth angle of 0° to 360° and a polar angle of 60° in a liquid crystal display apparatus.
Figure 12:
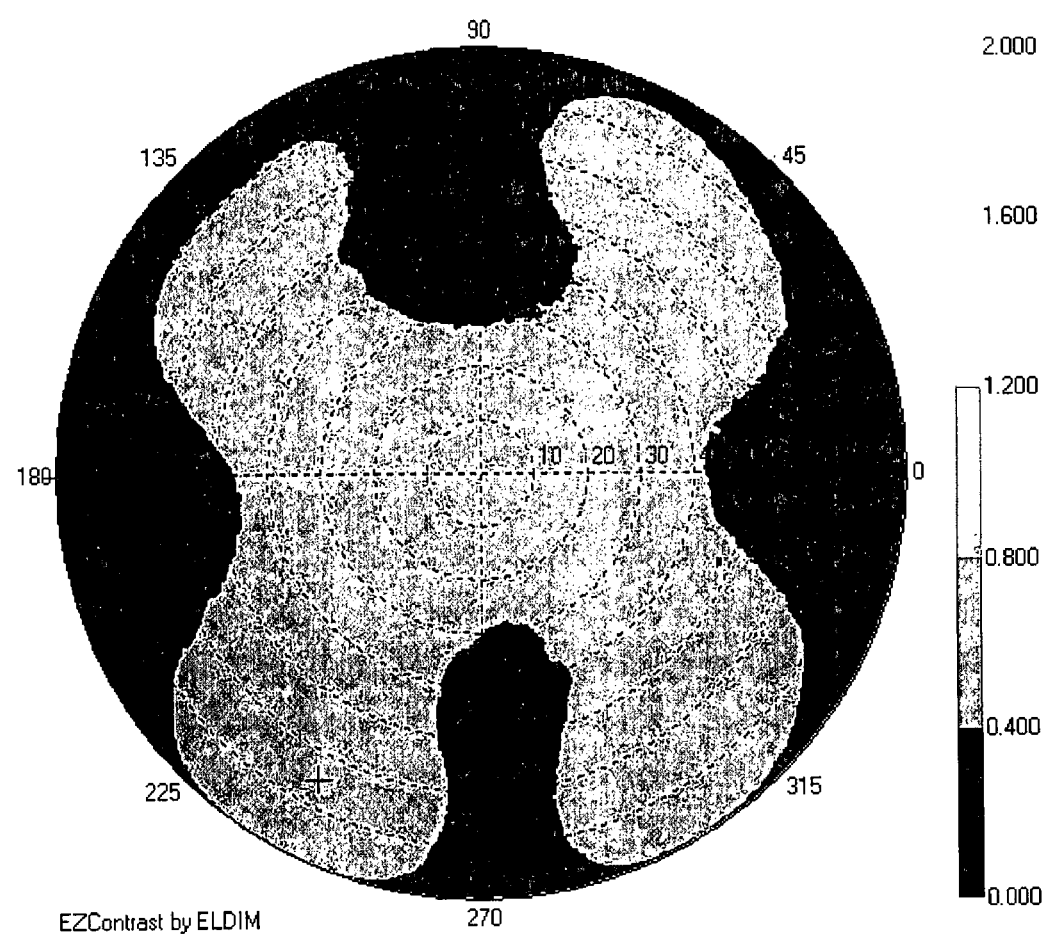
FIG. 12 is a brightness contour map of a liquid crystal display apparatus A.

The liquid crystal panel A thus produced has a structure as shown in FIG. 4. The liquid crystal panel A was combined with a backlight unit to produce a liquid crystal display apparatus A. The liquid crystal display apparatus A immediately after a backlight was lit had satisfactory display uniformity over an entire surface. After an elapse of 30 minutes from the lighting of the backlight, a contrast ratio in an oblique direction of the liquid crystal display apparatus A was measured. Table 4 shows the properties of the obtained liquid crystal display apparatus A. Further, FIG. 10 shows changes in tristimulus values Y at an azimuth angle of 0° to 360° and a polar angle of 60° in the liquid crystal display apparatus A, and FIG. 11 shows a change in a color shift amount ΔE at an azimuth angle of 0° to 360° and a polar angle of 60°. In addition, FIG. 12 shows a brightness contour map of the liquid crystal display apparatus A.

EXAMPLE 2

Production of a Liquid Crystal Panel B and a Liquid Crystal Display Apparatus B

Figure 13:
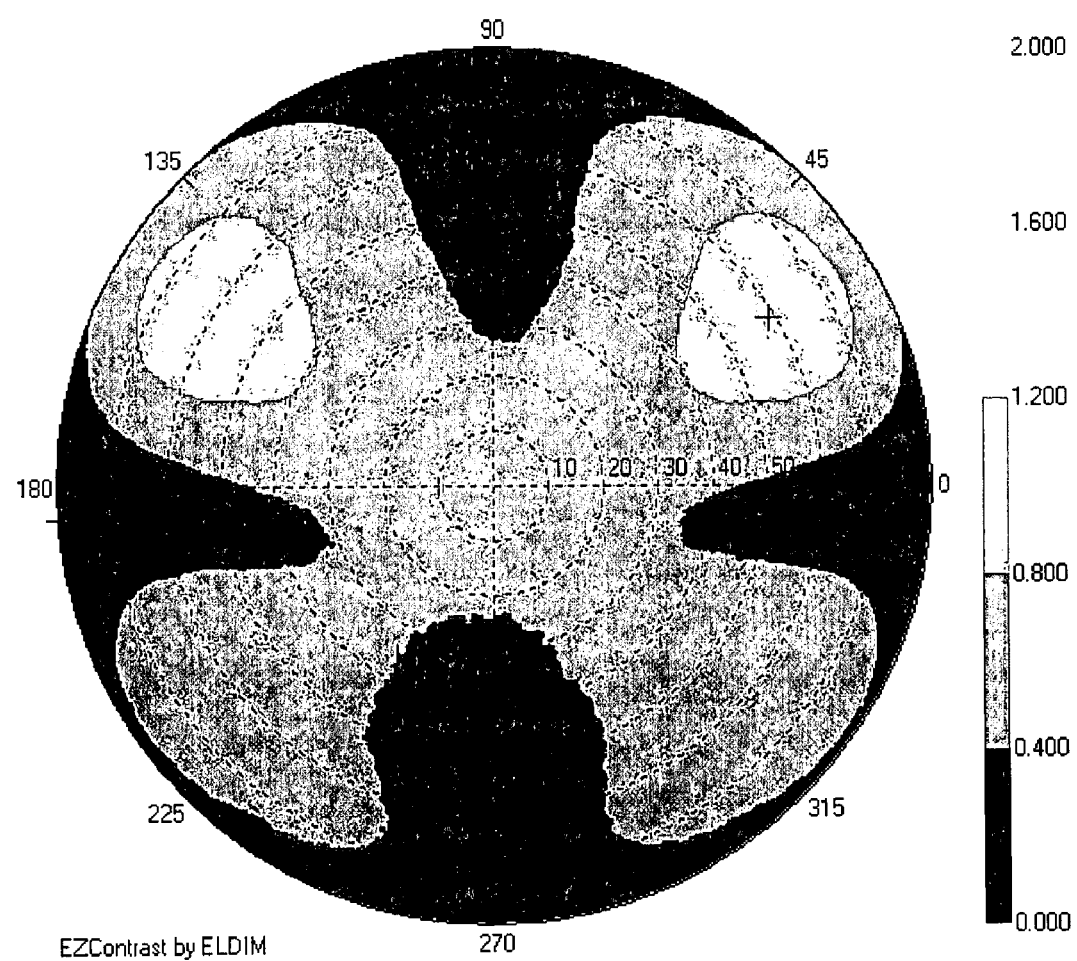
FIG. 13 is a brightness contour map of a liquid crystal display apparatus B.

A liquid crystal panel B was produced in the same way as in Example 1 except for using the retardation film 1-C as the first optical element. The liquid crystal panel B thus produced has a structure as shown in FIG. 4. The liquid crystal panel B was combined with a backlight unit to produce a liquid crystal display apparatus B. The liquid crystal display apparatus B immediately after a backlight was lit had satisfactory display uniformity over an entire surface. After an elapse of 30 minutes from the lighting of the backlight, a contrast ratio in an oblique direction of the liquid crystal display apparatus B was measured. Table 4 shows the properties of the obtained liquid crystal display apparatus B. Further, FIG. 13 shows a brightness contour map of the liquid crystal display apparatus B.

EXAMPLE 3

Production of a Liquid Crystal Panel C and a Liquid Crystal Display Apparatus C7

Figure 14:
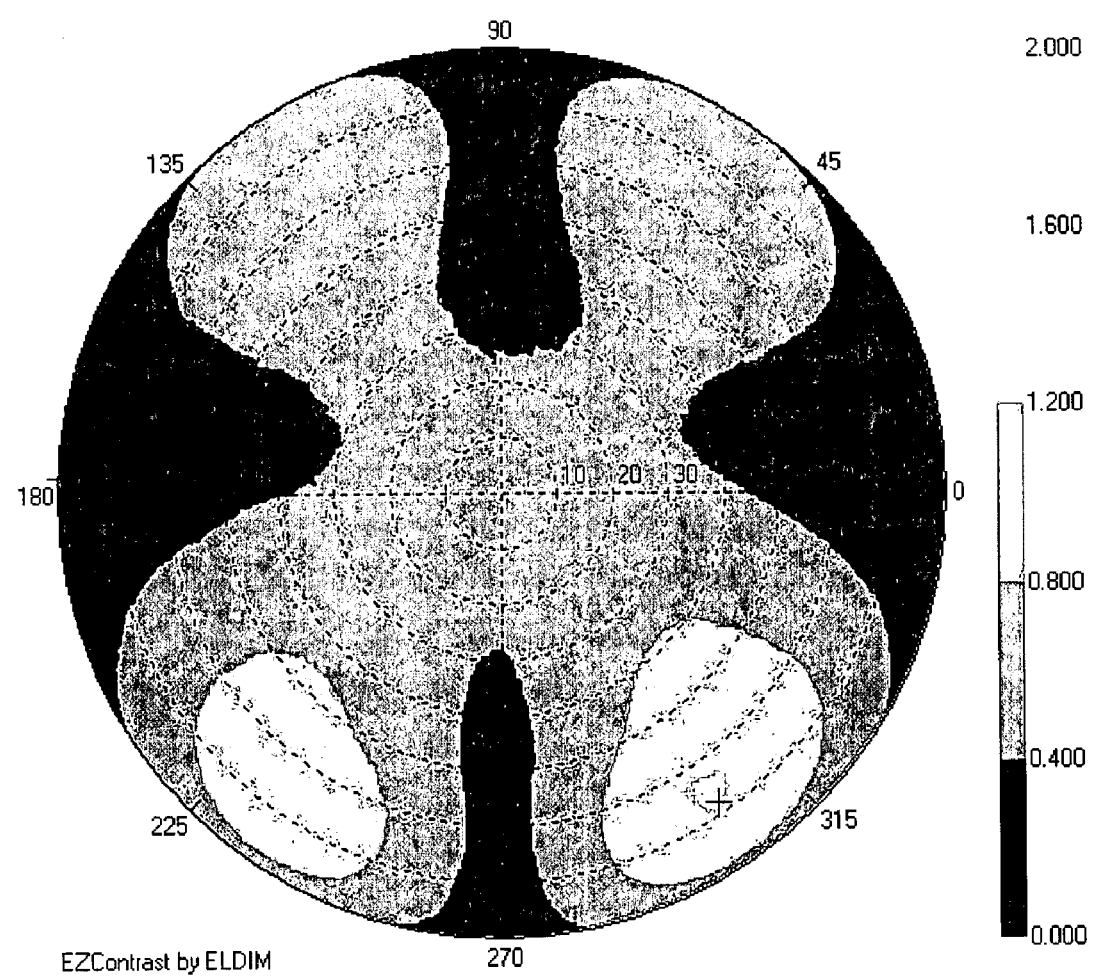
FIG. 14 is a brightness contour map of a liquid crystal display apparatus C.

A liquid crystal panel C was produced in the same way as in Example 1 except for using the retardation film 1-A as the first optical clement. The liquid crystal panel C thus produced has a structure as shown in FIG. 4. The liquid crystal panel C was combined with a backlight unit to produce a liquid crystal display apparatus C. The liquid crystal display apparatus C immediately after a backlight was lit had satisfactory display uniformity over an entire surface. After an elapse of 30 minutes from the lighting of the backlight, a contrast ratio in an oblique direction of the liquid crystal display apparatus C was measured. Table 4 shows the properties of the obtained liquid crystal display apparatus C. Further, FIG. 14 shows a brightness contour map of the liquid crystal display apparatus C.

EXAMPLE 4

Production of a Liquid Crystal Panel D and a Liquid Crystal Display Apparatus D

The retardation film 2-A obtained in Reference Example 8 was attached, as a second optical element, to the surface on a viewer side of the liquid crystal cell A obtained in Reference Example 10 via an acrylic pressure-sensitive adhesive layer (thickness: 23 µm) so that a slow axis direction thereof was substantially parallel (0°±0.5°) to a long side direction of the liquid crystal cell A. Then, a first optical element side of a retardation film 1-F obtained in Reference Example 7 was attached, as a laminate of a first optical element and a negative C plate, to the surface of the retardation film 2-A via an acrylic pressure-sensitive adhesive layer (thickness: 23 µm).

Then, the polarizer P1 obtained in Reference Example 1 was attached, as a first polarizer, to the surface of the negative C plate via an adhesive layer (thickness: 1 µm) so that an absorption axis direction thereof was substantially parallel (0°±0.5°) to the long side direction of the liquid crystal cell A. At this time, the initial alignment direction of the liquid crystal cell A, and the slow axis direction of the retardation film 2-A (second optical element) and the absorption axis direction of the polarizer P1 (first polarizer) are substantially perpendicular to each other.

Next, the optical film 3-A obtained in Reference Example 9 was attached, as a third optical element, to the surface on a backlight side of the liquid crystal cell A via an acrylic pressure-sensitive adhesive layer (thickness: 23 μm). Subsequently, the polarizer P2 obtained in Reference Example 1 was attached, as a second polarizer, to the surface of the optical film 3-A via an adhesive layer (thickness: 1 μm) so that an absorption axis direction thereof was substantially perpendicular (90°±0.5°) to the long side direction of the liquid crystal cell A. At this time, the absorption axis direction of the polarizer P1 and the absorption axis direction of the polarizer P2 are substantially perpendicular to each other. Further, the initial alignment direction of the liquid crystal cell A and the absorption axis direction of the polarizer P2 (second polarizer) are substantially parallel to each other. On outer sides (sides opposite to the liquid crystal cell) of the polarizers P1 and P2, triacetylcellulose film (Fujitac UZ (thickness: 80 μm) manufactured by Fuji Photo Film Co., Ltd.) were each attached as protective layers via adhesive layers (thickness: 1 μm).

Figure 5:
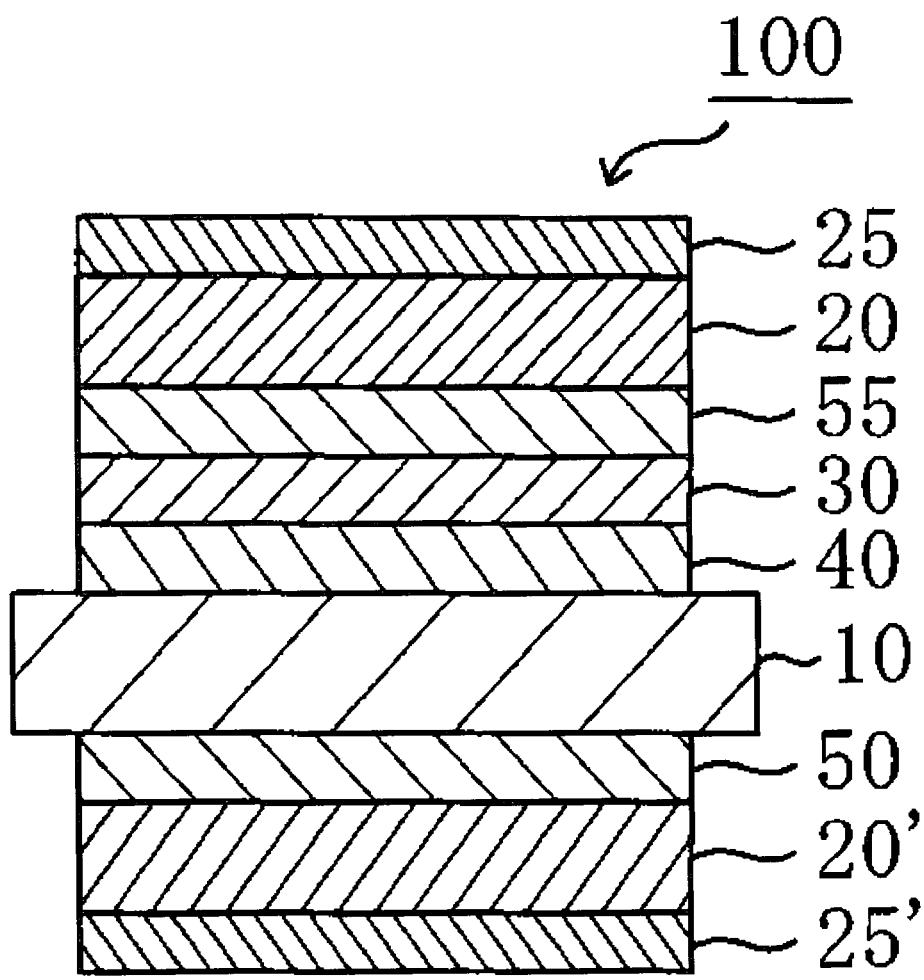
FIG. 5 is a schematic cross-sectional view of a liquid crystal panel obtained in Examples 4, 5, and 6.
Figure 15:
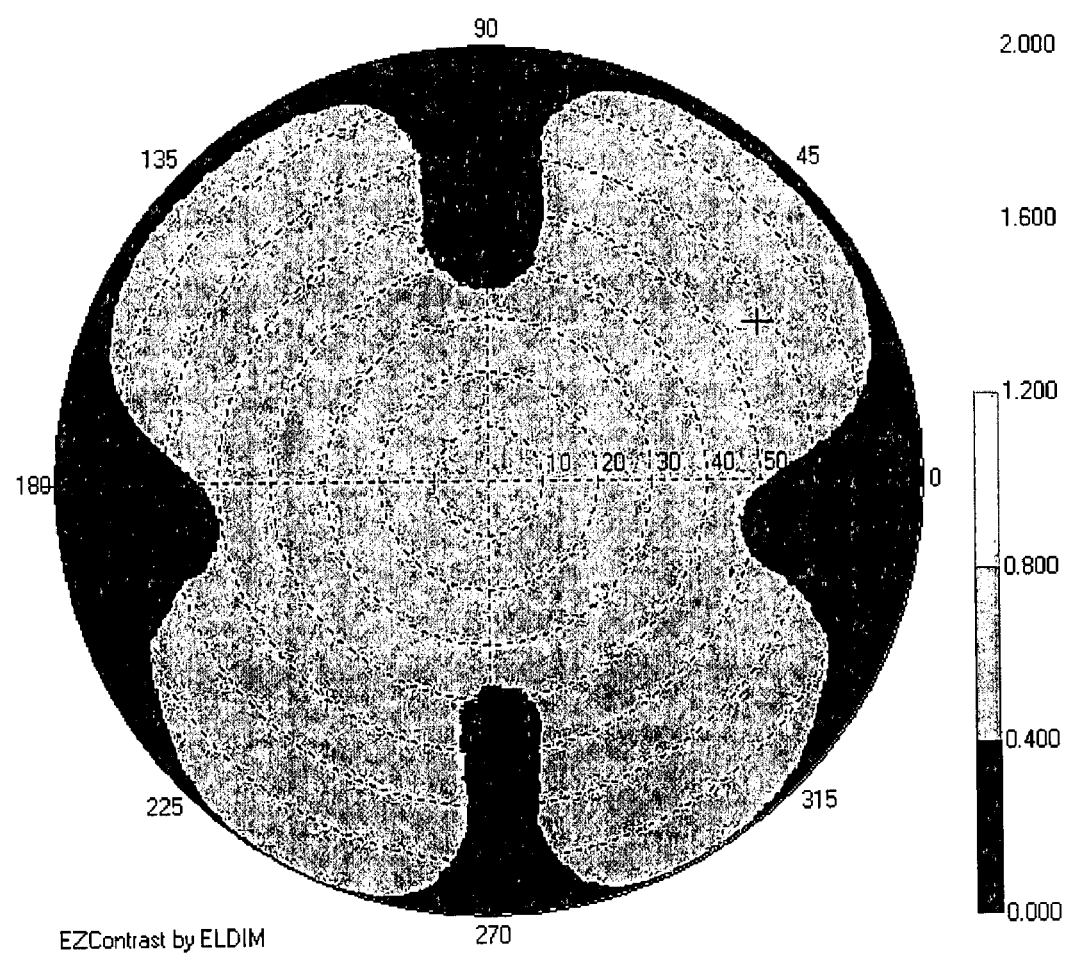
FIG. 15 is a brightness contour map of a liquid crystal display apparatus D.

The liquid crystal panel D thus produced has a structure as shown in FIG. 5. The liquid crystal panel D was combined with a backlight unit to produce a liquid crystal display apparatus D. The liquid crystal display apparatus D immediately after a backlight was lit had satisfactory display uniformity over an entire surface. After an elapse of 30 minutes from the lighting of the backlight, a contrast ratio in an oblique direction of the liquid crystal display apparatus D was measured. Table 4 shows the properties of the obtained liquid crystal display apparatus D. Further, FIG. 15 shows a brightness contour map of the liquid crystal display apparatus D.

EXAMPLE 5

Production of a Liquid Crystal Panel E and a Liquid Crystal Display Apparatus E

Figure 16:
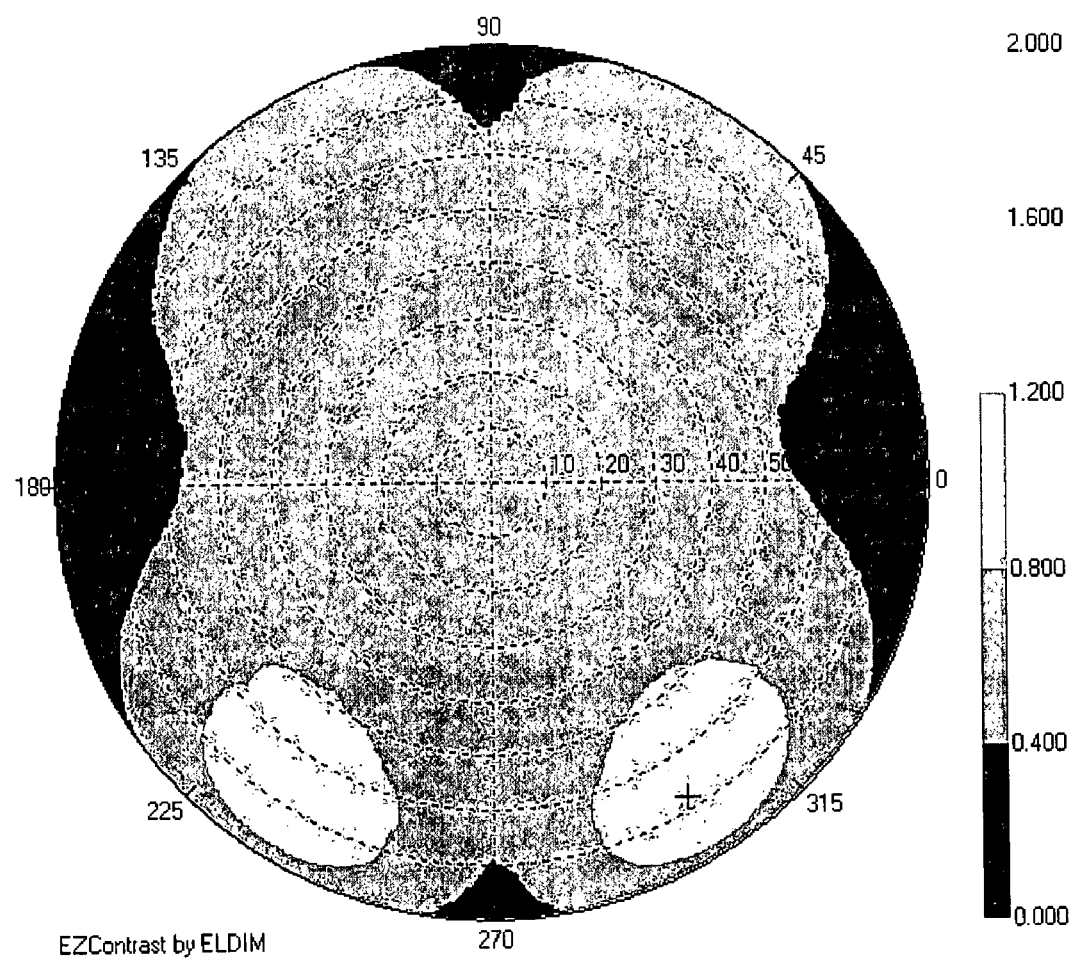
FIG. 16 is a brightness contour map of a liquid crystal display apparatus E.

A liquid crystal panel E was produced in the same way as in Example 4 except for using the retardation film 1-E as a laminate of a first optical element and a negative C plate. The liquid crystal panel E thus produced has a structure as shown in FIG. 5. The liquid crystal panel E was combined with a backlight unit to produce a liquid crystal display apparatus E. The liquid crystal display apparatus E immediately after a backlight was lit had satisfactory display uniformity over an entire surface. After an elapse of 30 minutes from the lighting of the backlight, a contrast ratio in an oblique direction of the liquid crystal display apparatus E was measured. Table 4 shows the properties of the obtained liquid crystal display apparatus E. Further, FIG. 16 shows a brightness contour map of the liquid crystal display apparatus E.

EXAMPLE 6

Production of a Liquid Crystal Panel F and a Liquid Crystal Display Apparatus F

Figure 17:
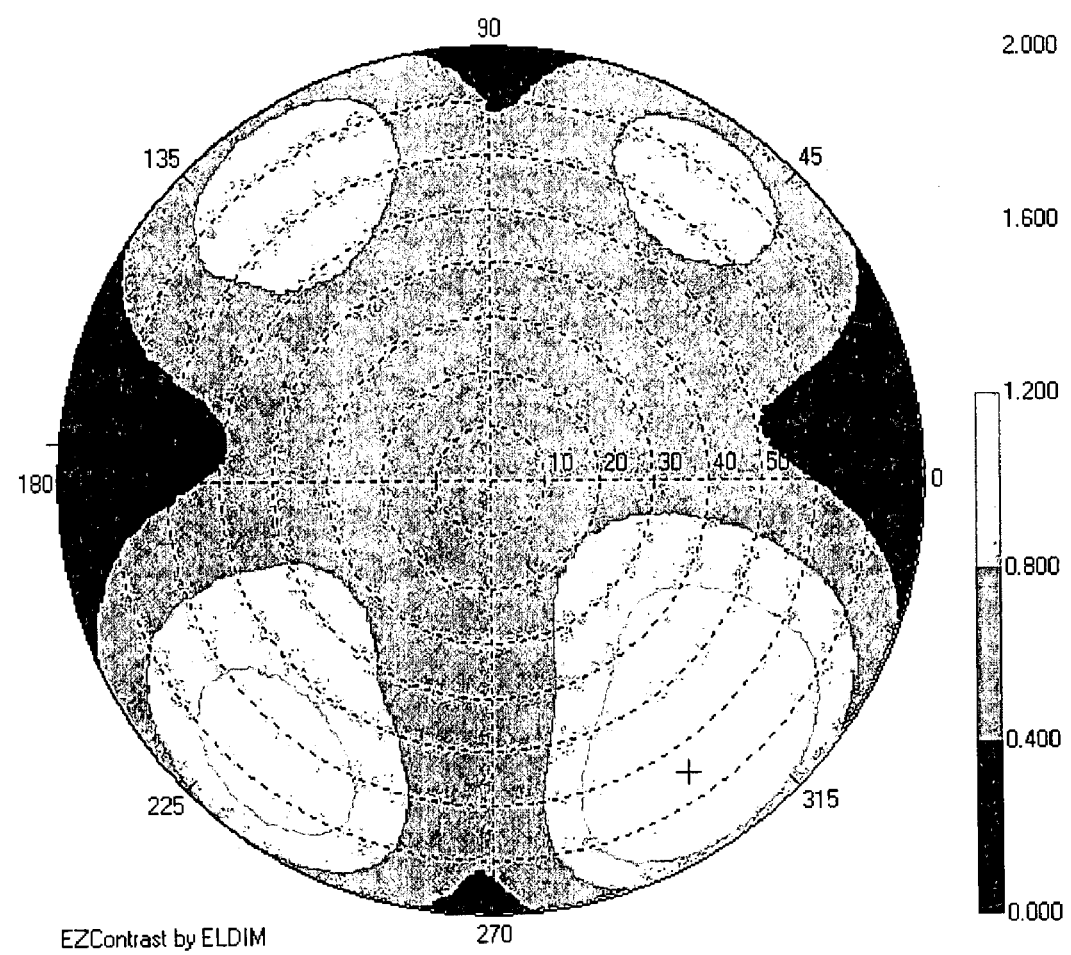
FIG. 17 is a brightness contour map of a liquid crystal display apparatus F.

A liquid crystal panel F was produced in the same way as in Example 4 except for using the retardation film 1-D as a laminate of a first optical element and a negative C plate. The liquid crystal panel F thus produced has a structure as shown in FIG. 5. The liquid crystal panel F was combined with a backlight unit to produce a liquid crystal display apparatus F. The liquid crystal display apparatus F immediately after a backlight was lit had satisfactory display uniformity over an entire surface. After an elapse of 30 minutes from the lighting of the backlight, a contrast ratio in an oblique direction of the liquid crystal display apparatus F was measured. Table 4 shows the properties of the obtained liquid crystal display apparatus F. Further, FIG. 17 shows a brightness contour map of the liquid crystal display apparatus F.

COMPARATIVE EXAMPLE 1

Production of a Liquid Crystal Panel G and a Liquid Crystal Display Apparatus G

Figure 18:
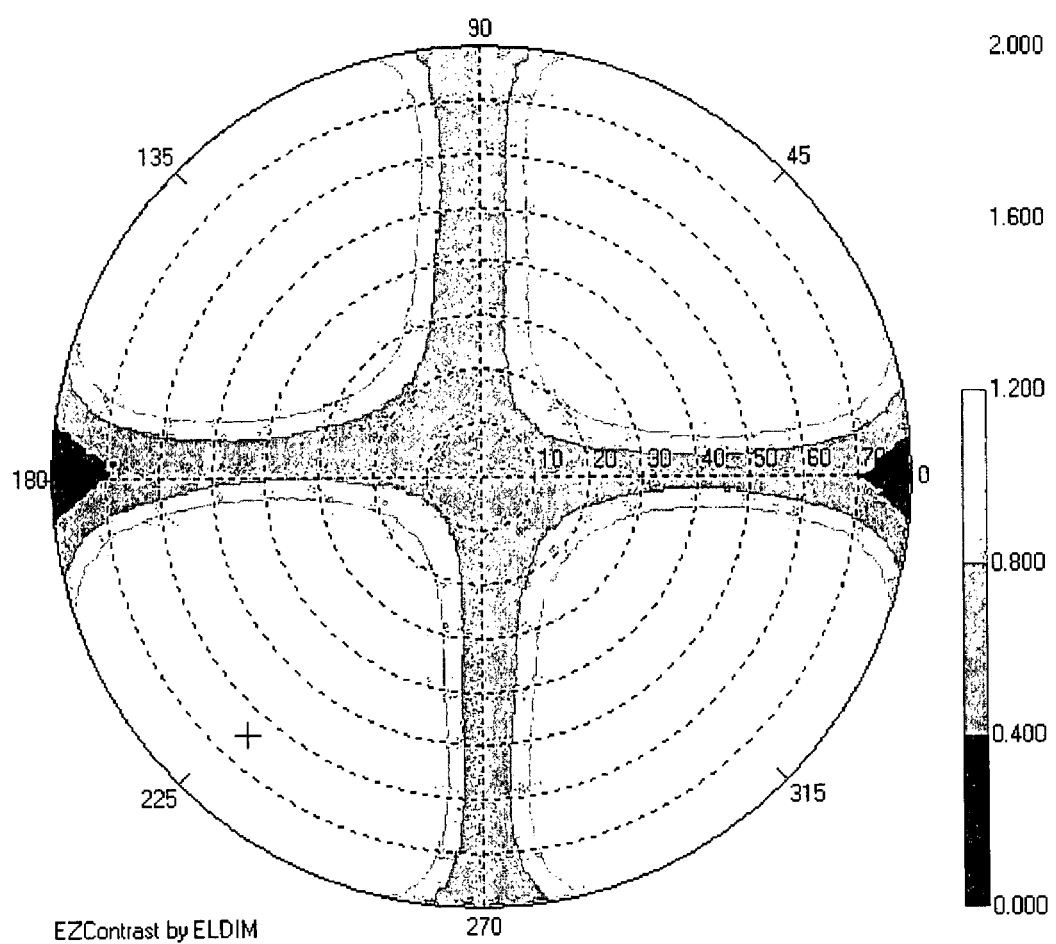
FIG. 18 is a brightness contour map of a liquid crystal display apparatus G.

A liquid crystal panel G was produced in the same way as in Example 1 except for placing the first polarizer and the second optical element so that the absorption axis direction of the first polarizer and the slow axis direction of the second optical element were substantially perpendicular to each other (90°±0.5°). The liquid crystal panel G thus produced has a structure as shown in FIG. 4. The liquid crystal panel G was combined with a backlight unit to produce a liquid crystal display apparatus G. The liquid crystal display apparatus G immediately after a backlight was lit had satisfactory display uniformity over an entire surface. After an elapse of 30 minutes from the lighting of the backlight, a contrast ratio in an oblique direction of the liquid crystal display apparatus G was measured. Table 4 shows the properties of the obtained liquid crystal display apparatus G. Further, FIG. 10 shows changes in tristimulus values Y at an azimuth angle of 0° to 360° and a polar angle of 60° in the liquid crystal display apparatus G, and FIG. 11 shows changes in a color shift amount ΔE at an azimuth angle of 0° to 360° and a polar angle of 60°. In addition, FIG. 18 shows a brightness contour map of the liquid crystal display apparatus G.

COMPARATIVE EXAMPLE 2

Production of a Liquid Crystal Panel H and a Liquid Crystal Display Apparatus H

Figure 6:
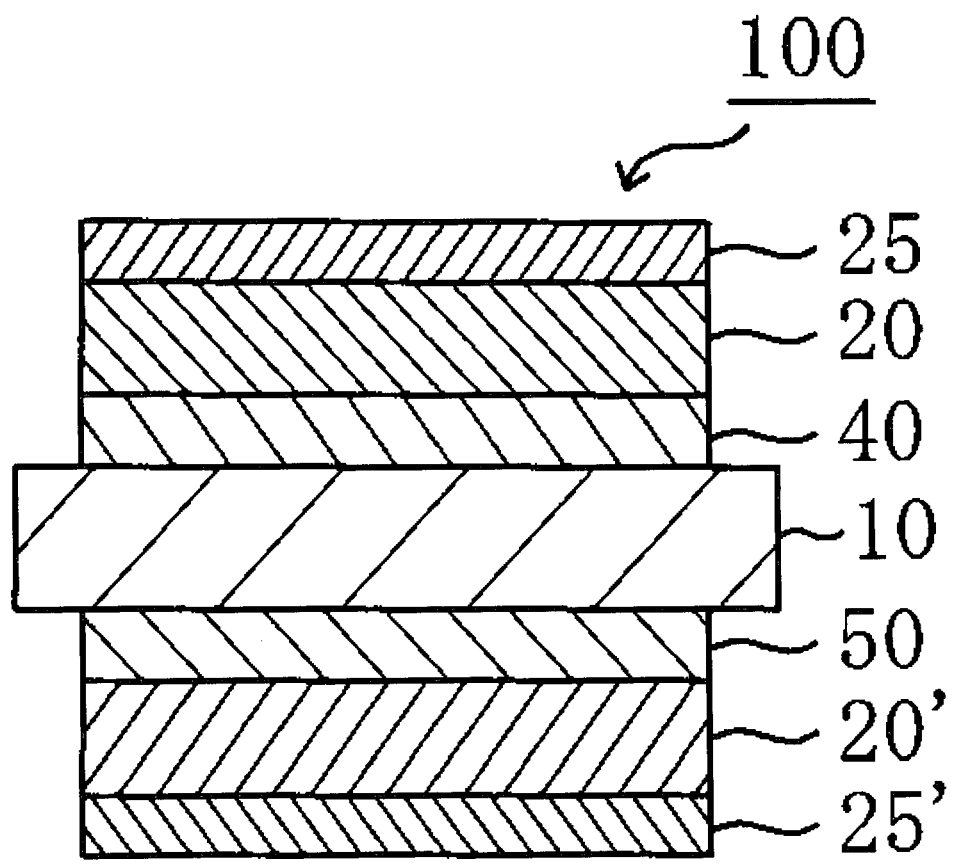
FIG. 6 is a schematic cross-sectional view of a liquid crystal panel obtained in Comparative Example 2.
Figure 19:
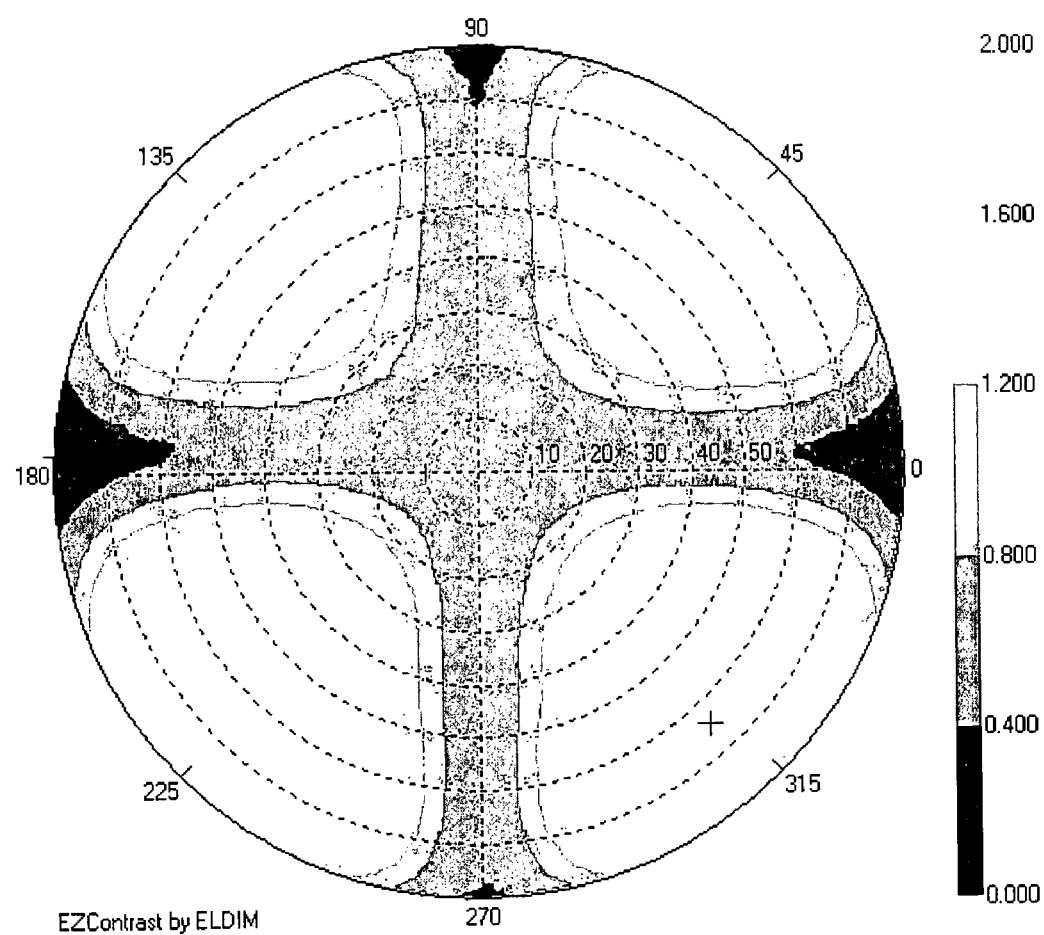
FIG. 19 is a brightness contour map of a liquid crystal display apparatus H.

A liquid crystal panel H was produced in the same way as in Example 1 except for attaching the polarizer P1 obtained in Reference Example 1, as a first polarizer, directly to the surface of the retardation film 2-A as a second optical element without providing the first optical element via an adhesive layer (thickness: 1 μm) so that an absorption axis direction of the polarizer P1 was substantially parallel (0°±0.5°) to the long side direction of the liquid crystal cell A. The liquid crystal panel H thus produced has a structure as shown in FIG. 6. The liquid crystal panel H was combined with a backlight unit to produce a liquid crystal display apparatus H. The liquid crystal display apparatus H immediately after a backlight was lit had satisfactory display uniformity over an entire surface. After an elapse of 30 minutes from the lighting of the backlight, a contrast ratio in an oblique direction of the liquid crystal display apparatus H was measured. Table 4 shows the properties of the obtained liquid crystal display apparatus H. Further, FIG. 10 shows changes in tristimulus values Y at an azimuth angle of 0° to 360° and a polar angle of 60° in the liquid crystal display apparatus H. In addition, FIG. 19 shows a brightness contour map of the liquid crystal display apparatus H.

COMPARATIVE EXAMPLE 3

Production of a Liquid Crystal Panel I and a Liquid Crystal Display Apparatus I

Figure 7:
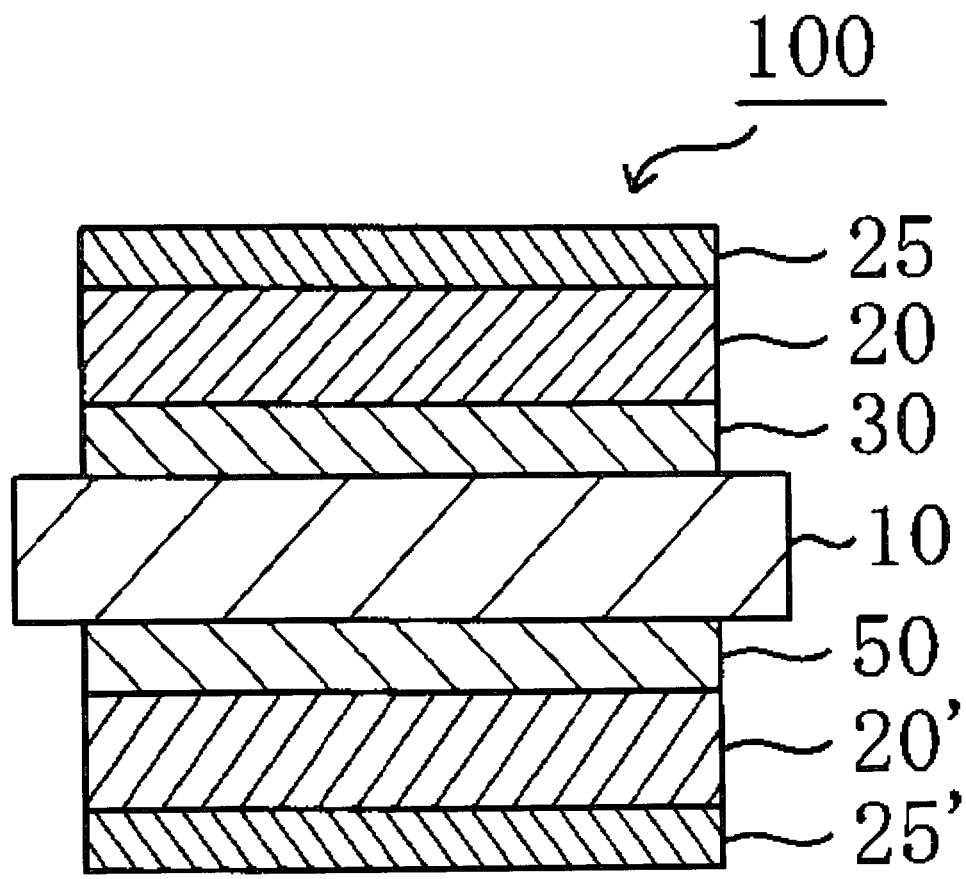
FIG. 7 is a schematic cross-sectional view of a liquid crystal panel obtained in Comparative Example 3.
Figure 20:
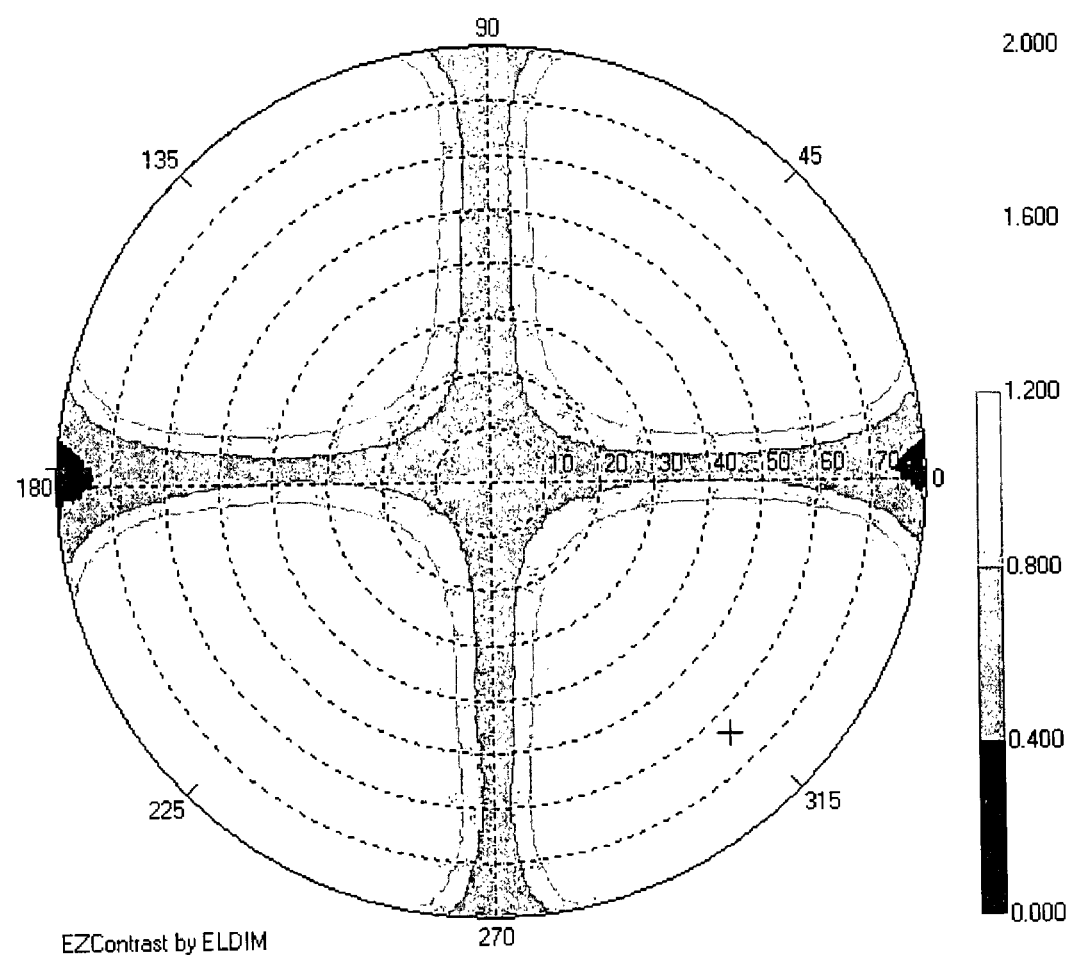
FIG. 20 is a brightness contour map of a liquid crystal display apparatus I.

A liquid crystal panel I was produced in the same way as in Example 1 except for attaching the retardation film 1-B obtained in Reference Example 3 as a first optical element to the surface on a viewer side of the liquid crystal cell A without providing the second optical element via an acrylic pressure-sensitive adhesive layer (thickness: 23 μm). The liquid crystal panel I thus produced has a structure as shown in FIG. 7. The liquid crystal panel I was combined with a backlight unit to produce a liquid crystal display apparatus I. The liquid crystal display apparatus I immediately after a backlight was lit had satisfactory display uniformity over an entire surface. After an elapse of 30 minutes from the lighting of the backlight, a contrast ratio in an oblique direction of the liquid crystal display apparatus I was measured. Table 4 shows the properties of the obtained liquid crystal display apparatus I. Further, FIG. 10 shows changes in tristimulus values Y at an azimuth angle of 0° to 360° and a polar angle of 60° in the liquid crystal display apparatus I, and FIG. 11 shows changes in a color shift amount ΔE at an azimuth angle of 0° to 360° and a polar angle of 60°. In addition, FIG. 20 shows a brightness contour map of the liquid crystal display apparatus I.

COMPARATIVE EXAMPLE 4

Production of a Liquid Crystal Panel J and a Liquid Crystal Display Apparatus J

A liquid crystal panel J was produced in the same way as in Example 1 except for attaching a negative C plate (Rth[590]=40 nm) as a third optical element to the surface on a backlight side of the liquid crystal cell A via an acrylic pressure-sensitive adhesive layer (thickness: 20 μm).

Herein, as the negative C plate, a commercially available polymer film containing triacetylcellulose as a main component having a thickness direction retardation value (Rth[590]) of 40 nm ("Fujitac UZ" (trade name) manufactured by Fuji Photo Film Co., Ltd.) was used.

Figure 8:
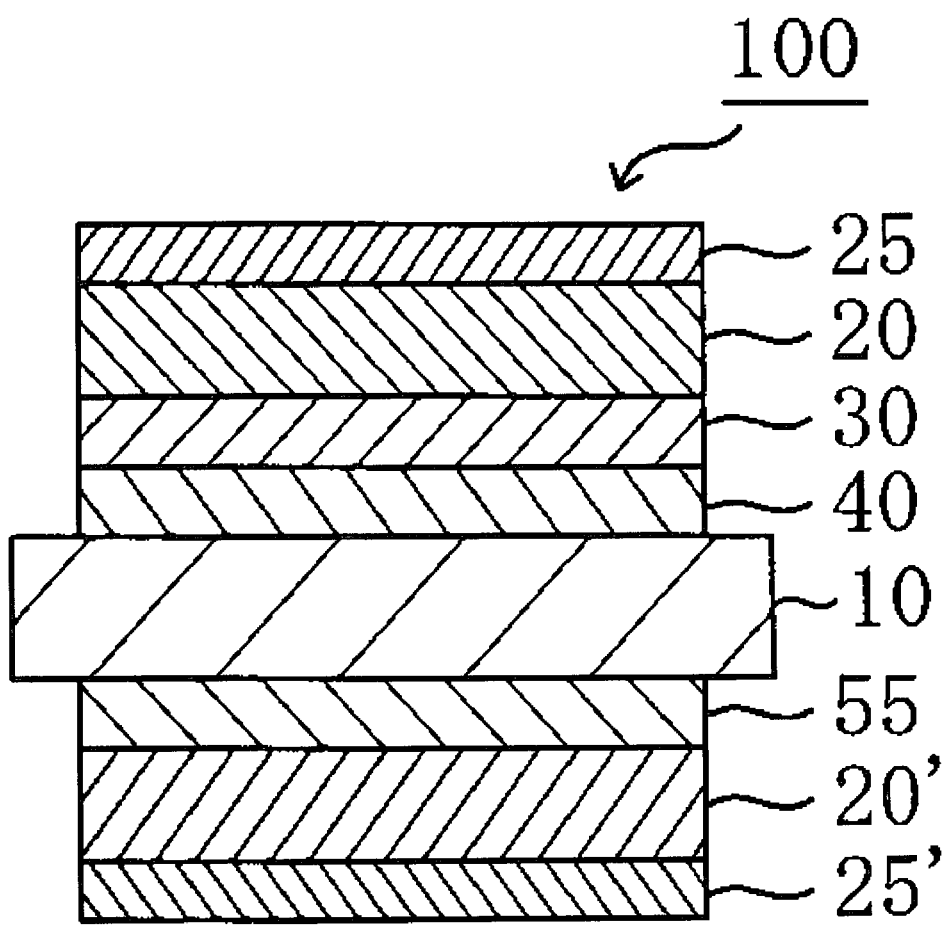
FIG. 8 is a schematic cross-sectional view of a liquid crystal panel obtained in Comparative Example 4.
Figure 21:
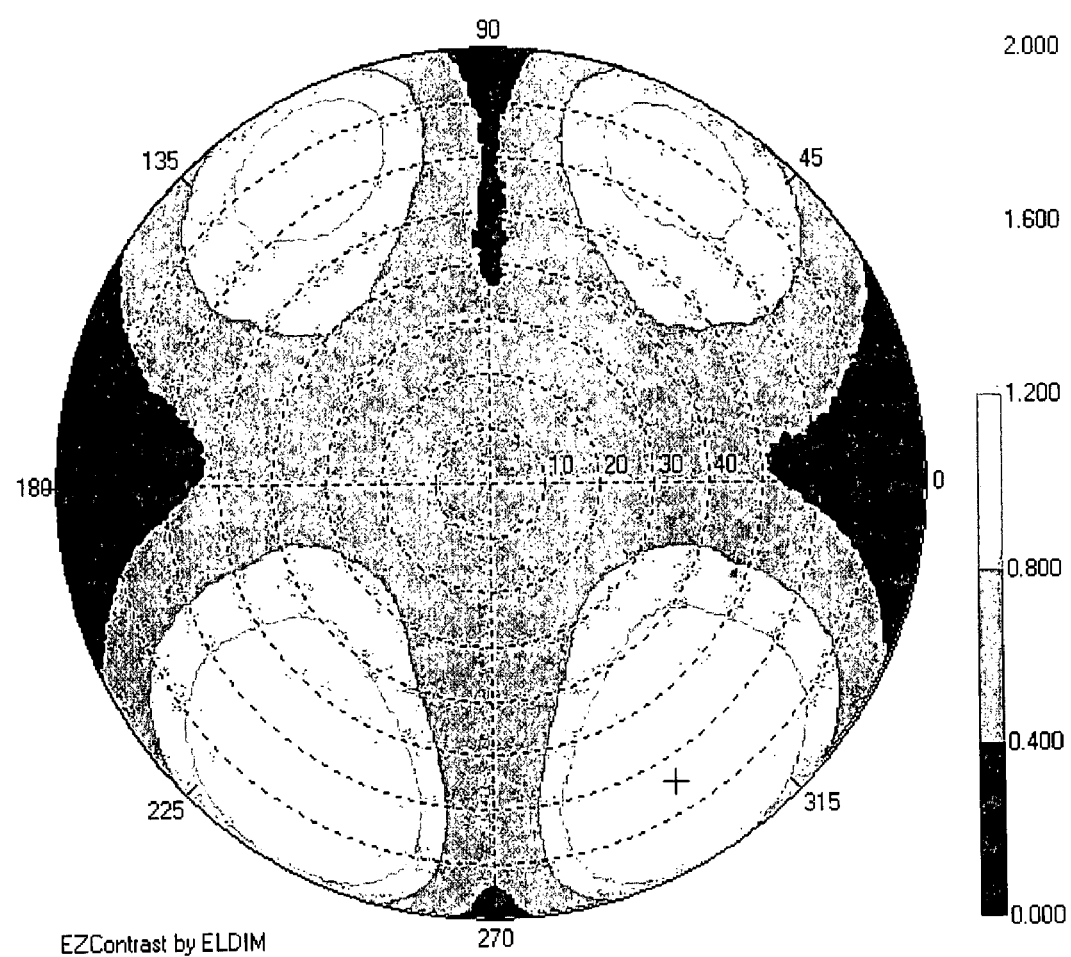
FIG. 21 is a brightness contour map of a liquid crystal display apparatus J.

The liquid crystal panel J thus produced has a structure as shown in FIG. 8. The liquid crystal panel J was combined with a backlight unit to produce a liquid crystal display apparatus J. The liquid crystal display apparatus J immediately after a backlight was lit had satisfactory display uniformity over an entire surface. After an elapse of 30 minutes from the lighting of the backlight, a contrast ratio in an oblique direction of the liquid crystal display apparatus J was measured. Table 4 shows the properties of the obtained liquid crystal display apparatus J. Further, FIG. 10 shows changes in tristimulus values Y at an azimuth angle of 0° to 360° and a polar angle of 60° in the liquid crystal display apparatus J. In addition, FIG. 21 shows a brightness contour map of the liquid crystal display apparatus J.

COMPARATIVE EXAMPLE 5

Production of a Liquid Crystal Panel K and a Liquid Crystal Display Apparatus K

The retardation film 2-A obtained in Reference Example 8 was attached, as a second optical element, to the surface on a viewer side of the liquid crystal cell A obtained in Reference Example 10 via an acrylic pressure-sensitive adhesive layer (thickness: 23 μm) so that a slow axis direction thereof was substantially parallel (0°±0.5°) to a long side direction of the liquid crystal cell A. Then, a first optical element side of a retardation film 1-D obtained in Reference Example 5 was attached, as a laminate of a first optical element and a negative C plate, to the surface of the retardation film 2-A via an acrylic pressure-sensitive adhesive layer (thickness: 23 μm).

Then, the polarizer P1 obtained in Reference Example 1 was attached, as a first polarizer, to the surface of the negative C plate via an adhesive layer (thickness: 1 μm) so that an absorption axis direction thereof was substantially parallel (0°±0.5°) to the long side direction of the liquid crystal cell A. At this time, the initial alignment direction of the liquid crystal cell A, and the slow axis direction of the retardation film 2-A (second optical element) and the absorption axis direction of the polarizer P1 (first polarizer) are substantially perpendicular to each other.

Then, a negative C plate (Rth[590]=40 nm) was attached, as a third optical element, to the surface on a backlight side of the liquid crystal cell A via an acrylic pressure-sensitive adhesive layer (thickness: 20 μm).

Herein, as the negative C plate, a commercially available polymer film containing triacetylcellulose as a main component having a thickness direction retardation value (Rth[590]) of 40 nm ("Fujitac UZ" (trade name) manufactured by Fuji Photo Film Co., Ltd.) was used.

Subsequently, the polarizer P2 obtained in Reference Example 1 was attached, as a second polarizer, to the surface of the negative C plate via an adhesive layer (thickness: 1 μm) so that an absorption axis direction thereof was substantially perpendicular (90°±0.5°) to the long side direction of the liquid crystal cell A. At this time, the absorption axis direction of the polarizer P1 and the absorption axis direction of the polarizer P2 are substantially perpendicular to each other. Further, the initial alignment direction of the liquid crystal cell A and the absorption axis direction of the polarizer P2 (second polarizer) are substantially parallel to each other. On outer sides (sides opposite to the liquid crystal cell) of the polarizers P1 and P2, triacetylcellulose film (Fujitac UZ (thickness: 80 μm) manufactured by Fuji Photo Film Co., Ltd.) were each attached as protective layers via adhesive layers (thickness: 1 μm).

Figure 9:
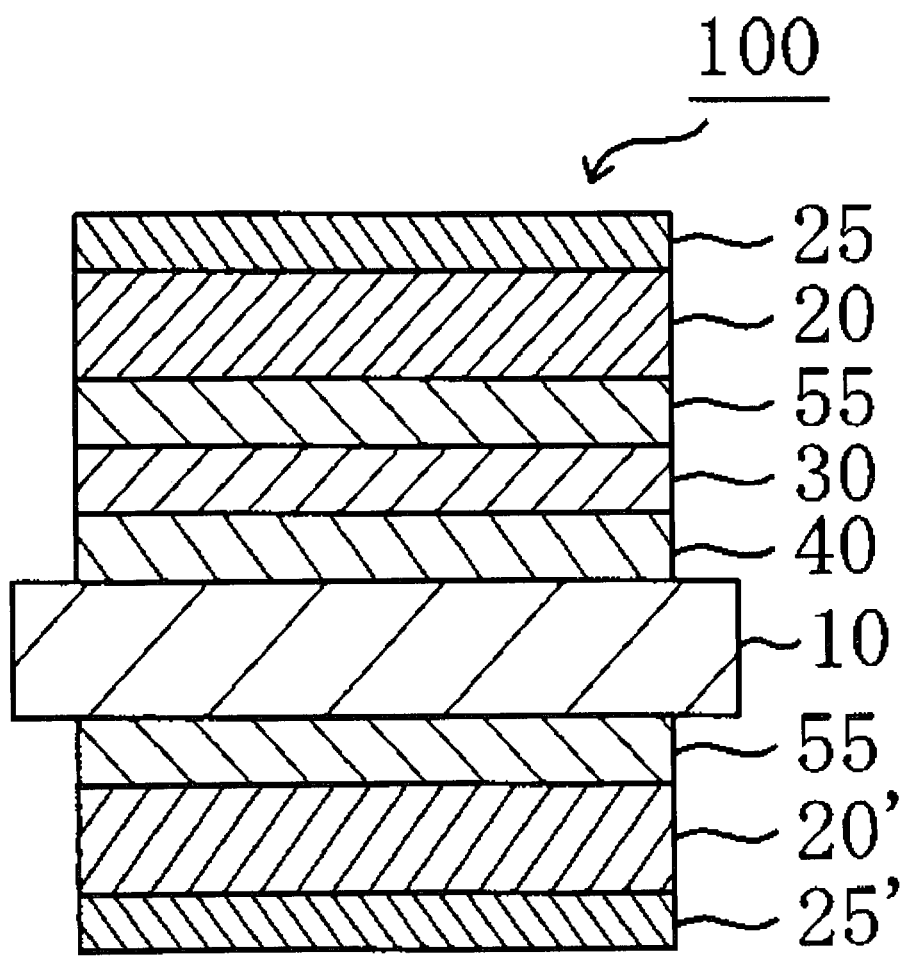
FIG. 9 is a schematic cross-sectional view of a liquid crystal panel obtained in Comparative Example 5.
Figure 22:
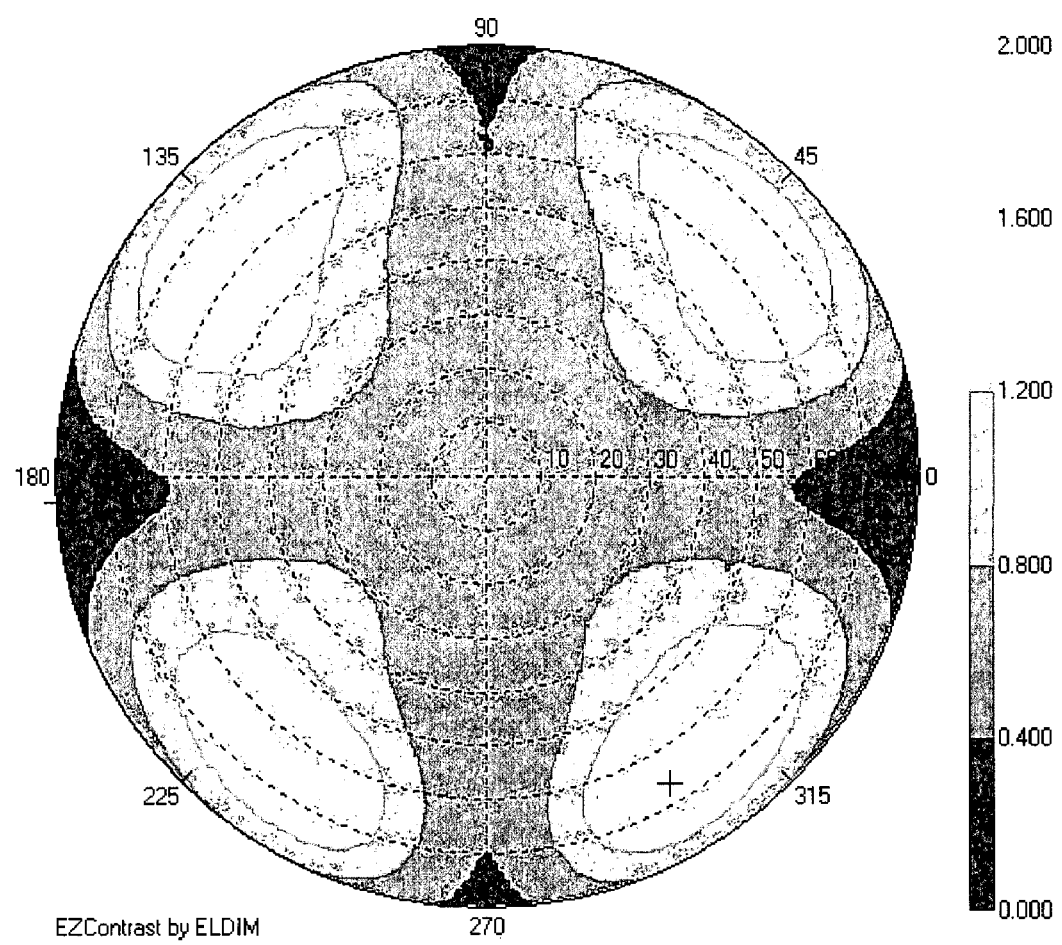
FIG. 22 is a brightness contour map of a liquid crystal display apparatus K.

The liquid crystal panel K thus produced has a structure as shown in FIG. 9. The liquid crystal panel K was combined with a backlight unit to produce a liquid crystal display apparatus K. The liquid crystal display apparatus K immediately after a backlight was lit had satisfactory display uniformity over an entire surface. After an elapse of 30 minutes from the lighting of the backlight, a contrast ratio in an oblique direction of the liquid crystal display apparatus K was measured. Table 4 shows the properties of the obtained liquid crystal display apparatus K. Further, FIG. 22 shows a brightness contour map of the liquid crystal display apparatus K.

TABLE 4

| | First optical element | | Second optical element | | Third optical element | | Liquid crystal panel Structure | Liquid crystal display apparatus (polar angle 60° Y) | | | Liquid crystal display apparatus (polar angle 60° ΔE) | | |
|---|---|---|---|---|---|---|---|---|---|---|---|---|---|
| | | Rth [590] (nm) | | Axis relation-ship[1] | Re [590] (nm) | | Rth [590] (nm) | | Average value | Maximum value | Maximum value − Minimum value | Average value | Maximum value | Maximum value − Minimum value |
| Example 1 | 1-B | −100 | 2-A | Parallel | 140 | 3-A | 2 | FIG. 4 | 0.43 | 0.66 | 0.37 | 16.3 | 29.1 | 24.5 |
| Example 2 | 1-C | −120 | 2-A | Parallel | 140 | 3-A | 2 | FIG. 4 | 0.55 | 1.06 | 0.79 | 22.0 | 32.3 | 26.3 |
| Example 3 | 1-A | −80 | 2-A | Parallel | 140 | 3-A | 2 | FIG. 4 | 0.59 | 1.15 | 0.89 | 12.3 | 21.7 | 17.8 |

TABLE 4-continued

| | First optical element | | Second optical element | | Third optical element | Liquid crystal panel Structure | Liquid crystal display apparatus (polar angle 60° Y) | | | Liquid crystal display apparatus (polar angle 60° ΔE) | | |
|---|---|---|---|---|---|---|---|---|---|---|---|---|
| | | Rth [590] (nm) | Axis relation-ship[1] | Re [590] (nm) | Rth [590] (nm) | | Average value | Maximum value | Maximum value − Minimum value | Average value | Maximum value | Maximum value − Minimum value |
| Example 4 | 1-F[2] | −100 | 2-A Parallel | 140 | 3-A 2 | FIG. 5 | 0.49 | 0.67 | 0.36 | 21.4 | 33.3 | 27.5 |
| Example 5 | 1-E[2] | −80 | 2-A Parallel | 140 | 3-A 2 | FIG. 5 | 0.61 | 1.04 | 0.69 | 16.5 | 30.2 | 25.2 |
| Example 6 | 1-D[2] | −60 | 2-A Parallel | 140 | 3-A 2 | FIG. 5 | 0.86 | 1.93 | 1.61 | 13.4 | 24.8 | 20.0 |
| Comparative Example 1 | 1-B | −100 | 2-A Perpendicular | 140 | 3-A 2 | FIG. 4 | 4.00 | 8.15 | 7.66 | 29.3 | 42.2 | 32.5 |
| Comparative Example 2 | — | — | 2-A Parallel | 140 | 3-A 2 | FIG. 6 | 2.48 | 5.27 | 4.38 | 17.6 | 27.9 | 21.5 |
| Comparative Example 3 | 1-B | −100 | — — | — | 3-A 2 | FIG. 7 | 4.89 | 10.01 | 9.41 | 26.8 | 40.7 | 31.5 |
| Comparative Example 4 | 1-B | −100 | 2-A Parallel | 140 | 3-B 40 | FIG. 8 | 1.07 | 2.42 | 2.08 | 13.7 | 23.7 | 18.9 |
| Comparative Example 5 | 1-B | −100 | 2-A Parallel | 140 | 3-B 40 | FIG. 9 | 1.06 | 1.64 | 1.28 | 17.9 | 32.1 | 26.6 |

[1]In the table, the "axis relation" refers to a positional relationship between the absorption axis direction of the first polarizer and the slow axis direction of the second optical element.
[2]Laminate of the first optical element and the negative C plate.

INDUSTRIAL APPLICABILITY

The liquid crystal panel of the present invention can be used preferably for various liquid crystal display apparatuses such as a personal computer and a liquid crystal television.

The invention claimed is:

1. A liquid crystal panel, at least comprising:
a liquid crystal cell;
a first polarizer placed on one side of the liquid crystal cell;
a second polarizer placed on another side of the liquid crystal cell;
a first optical element placed between the liquid crystal cell and the first polarizer;
a second optical element placed between the liquid crystal cell and the first optical element; and
a third optical element placed between the liquid crystal cell and the second polarizer, wherein:
an absorption axis direction of the first polarizer is substantially perpendicular to an absorption axis direction of the second polarizer;
the first optical element has a refractive index ellipsoid of nz>nx=ny;
the second optical element has a refractive index ellipsoid of nx>ny=nz, and a slow axis direction thereof is substantially parallel to an absorption axis direction of the first polarizer; and
the third optical element has isotropy substantially optically,
where nx, ny, and nz represent a refractive index in a slow axis direction, a refractive index in a fast axis direction, and a refractive index in a thickness direction.

2. A liquid crystal panel according to claim 1, wherein the liquid crystal cell has a liquid crystal layer containing liquid crystal molecules aligned homogeneously in absence of an electric field.

3. A liquid crystal panel according to claim 1, wherein an initial alignment direction of the liquid crystal cell and an absorption axis direction of the second polarizer are substantially parallel to each other.

4. A liquid crystal panel according to claim 1, wherein an initial alignment direction of the liquid crystal cell and a slow axis direction of the second optical element are substantially perpendicular to each other.

5. A liquid crystal panel according to claim 1, wherein a sum of Rth[590] of the first optical element and Re[590] of the second optical element, Rth[590]+Re[590], is −10 nm to 120 nm,
where Rth[590] and Re[590] are a thickness direction retardation value and an in-plane retardation value, respectively, measured with a light having a wavelength of 590 nm at 23° C.

6. A liquid crystal panel according to claim 1, wherein the first optical element has Rth[590] of −200 nm to −50 nm,
where Rth[590] is an thickness direction retardation value measured with a light having a wavelength of 590 nm at 23° C.

7. A liquid crystal panel according to, claim 1, wherein the first optical element has a wavelength dispersion value ($D_1$) of 0.70 to 1.10,
where $D_1$ is a value calculated from an expression: R40[480]/R40[590], and R40[480] and R40[590] are retardation values measured at a tilt angle of 40° from a normal direction with light having wavelengths of 480 nm and 590 nm at 23° C., respectively.

8. A liquid crystal panel according to claim 1, wherein the first optical element includes a solidified layer or cured layer of a liquid crystalline composition containing a homeotropically aligned liquid crystal compound.

9. A liquid crystal panel according to claim 1, wherein the second optical element has Re[590] of 90 nm to 190 nm,
where Re[590] is an in-plane retardation value measured with a light having a wavelength of 590 nm at 23° C.

10. A liquid crystal panel according to claim 1, wherein the second optical element has a wavelength dispersion value ($D_2$) of 0.70 to 1.10,
where $D_2$ is a value calculated from an expression: Re[480]/Re[590] and Re[480] and Re[590] are in-plane retardation values measured from a normal direction with light having wavelengths of 480 nm and 590 nm at 23° C., respectively.

11. A liquid crystal panel according to claim 1, wherein the second optical element includes a retardation film containing, as a main component, a norbornene-based resin, a cellulose-based resin, or a polycarbonate-based resin.

12. A liquid crystal panel according to claim 1, wherein the third optical element has an absolute value of a photoelastic coefficient measured with a light having a wavelength of 590 nm at 23° C., C[590]($m^2$/N), of $1.0 \times 10^{-12}$ to $8.0 \times 10^{-11}$.

13. A liquid crystal panel according to claim 1, wherein the third optical element includes an optical film containing, as a main component, a norbornene-based resin, a cellulose-based resin, or an acrylic resin.

14. A liquid crystal display apparatus, comprising the liquid crystal panel according to claim 1.

15. A liquid crystal display apparatus according to claim 14, wherein a maximum value of tristimulus values Y defined in a CIE1931XYZ display system at a polar angle of 60° and an azimuth angle of 0° to 360° in a case where a black image is displayed is 1.5 or less.

16. A liquid crystal display apparatus according to claim 14, wherein a difference between a maximum value and a minimum value of tristimulus values Y defined in a CIE1931XYZ display system at a polar angle of 60° and an azimuth angle of 0° to 360° in a case where a black image is displayed is 1.0 or less.

17. A liquid crystal display apparatus according to claim 14, which is used for a liquid crystal television.

* * * * *